United States Patent
Oyabu

(10) Patent No.: US 10,841,861 B2
(45) Date of Patent: Nov. 17, 2020

(54) ELECTRONIC APPARATUS, METHOD FOR CONTROLLING ELECTRONIC APPARATUS, AND STORAGE MEDIUM

(71) Applicant: KYOCERA Corporation, Kyoto (JP)

(72) Inventor: Takahiro Oyabu, Hachioji (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/580,934

(22) Filed: Sep. 24, 2019

(65) Prior Publication Data
US 2020/0022066 A1 Jan. 16, 2020

Related U.S. Application Data

(63) Continuation of application No. PCT/JP2018/011054, filed on Mar. 20, 2018.

(30) Foreign Application Priority Data

Mar. 27, 2017 (JP) ................................. 2017-060933

(51) Int. Cl.
*H04W 48/04* (2009.01)
*H04B 17/318* (2015.01)
*H04W 4/40* (2018.01)
*G05D 1/00* (2006.01)
*G08G 1/0962* (2006.01)
*H04W 64/00* (2009.01)

(52) U.S. Cl.
CPC .......... *H04W 48/04* (2013.01); *H04B 17/318* (2015.01); *H04W 4/40* (2018.02); *H04W 64/00* (2013.01); *G05D 1/0088* (2013.01); *G05D 2201/0213* (2013.01); *G08G 1/0962* (2013.01)

(58) Field of Classification Search
CPC ....... H04W 4/00; H04W 48/04; H04W 64/00; H04B 17/318; G05D 1/0088; G05D 2201/0213; G08G 1/0962
USPC .......................................................... 455/421
See application file for complete search history.

(56) References Cited

U.S. PATENT DOCUMENTS

| | | | |
|---|---|---|---|
| 6,782,266 B2 * | 8/2004 | Baer .................. | H04B 7/18506 455/421 |
| 9,988,016 B1 * | 6/2018 | Bianchi, III ............ | B60R 25/24 |
| 2008/0242278 A1 * | 10/2008 | Rekimoto ............. | H04W 12/02 455/414.2 |

(Continued)

FOREIGN PATENT DOCUMENTS

| | | |
|---|---|---|
| JP | 2008-252298 A | 10/2008 |
| JP | 2009-045956 A | 3/2009 |
| JP | 2013-115721 A | 6/2013 |

*Primary Examiner* — William Nealon
(74) *Attorney, Agent, or Firm* — Studebaker & Brackett PC

(57) ABSTRACT

An electronic apparatus comprises a communication unit and at least one processor. The communication unit performs wireless communication with an external device and a vehicle. (i) Upon receiving, via the communication unit, a reception signal transmitted from the external device through one-to-many communication, the at least one processor makes a determination based on the reception signal, about whether a first distance between the electronic apparatus and the external device is shorter than a distance reference value. (ii) Upon determining that the first distance is shorter than the distance reference value, the at least one processor performs a restricting process of restricting transmission of a transmission signal via the communication unit.

14 Claims, 10 Drawing Sheets

(56) References Cited

U.S. PATENT DOCUMENTS

| | | | |
|---|---|---|---|
| 2012/0302219 A1* | 11/2012 | Vang | H04W 4/023 |
| | | | 455/414.1 |
| 2016/0100371 A1* | 4/2016 | Jiang | H04W 52/50 |
| | | | 455/522 |
| 2016/0224778 A1* | 8/2016 | Kim | H04B 17/318 |
| 2018/0122240 A1* | 5/2018 | Shirosaki | H04W 4/70 |

* cited by examiner though one-to-many communication, making a determination based on the reception signal, about whether a first distance between the electronic apparatus and the external device is shorter than a distance reference value; and upon determining that the first distance is shorter than the distance reference value, restricting transmission of a transmission signal via the communication unit.

ELECTRONIC APPARATUS, METHOD FOR CONTROLLING ELECTRONIC APPARATUS, AND STORAGE MEDIUM

CROSS-REFERENCE TO RELATED APPLICATION

The present application is a continuation based on PCT Application No. PCT/JP2018/011054, filed on Mar. 20, 2018, which claims the benefit of Japanese Patent Application No. 2017-060933, filed on Mar. 27, 2017. PCT Application No. PCT/JP2018/011054 is entitled "ELECTRONIC DEVICE, ELECTRONIC DEVICE CONTROL METHOD, AND RECORDING MEDIUM", and Japanese Patent Application No. 2017-060933 is entitled "ELECTRONIC APPARATUS, METHOD FOR CONTROLLING ELECTRONIC APPARATUS, AND CONTROL PROGRAM". The contents of which are incorporated by reference herein in their entirety.

FIELD

The present disclosure relates to an electronic apparatus, a method for controlling the electronic apparatus, and a storage medium.

BACKGROUND

Various techniques have been proposed in relation to electronic apparatuses.

SUMMARY

Disclosed are an electronic apparatus, a method for operating the electronic apparatus, and a storage medium. One embodiment provides an electronic apparatus comprising a communication unit and at least one processor. The communication unit can perform wireless communication with an external device and a vehicle. (i) Upon receiving, via the communication unit, a reception signal transmitted from the external device through one-to-many communication, the at least one processor can make a determination based on the reception signal, about whether a first distance between the electronic apparatus and the external device is shorter than a distance reference value. (ii) Upon determining that the first distance is shorter than the distance reference value, the at least one processor can perform a restricting process of restricting transmission of a transmission signal via the communication unit.

Another embodiment provides a method for controlling an electronic apparatus comprising a communication unit that can perform wireless communication with an external device and a vehicle. The method comprises first and second steps. The first step comprises, upon receiving, via the communication unit, a reception signal transmitted from the external device through one-to-many communication, making a determination based on the reception signal, about whether a first distance between the electronic apparatus and the external device is shorter than a distance reference value. The second step comprises, upon determining that the first distance is shorter than the distance reference value, restricting transmission of a transmission signal via the communication unit.

Still another embodiment provides a non-transitory computer-readable storage medium storing a control program for controlling an electronic apparatus comprising a communication unit that can perform wireless communication with an external device and a vehicle, to perform the following processes: upon receiving, via the communication unit, a reception signal transmitted from the external device through one-to-many communication, making a determination based on the reception signal, about whether a first distance between the electronic apparatus and the external device is shorter than a distance reference value; and upon determining that the first distance is shorter than the distance reference value, restricting transmission of a transmission signal via the communication unit.

DETAILED DESCRIPTION

Figure 1:
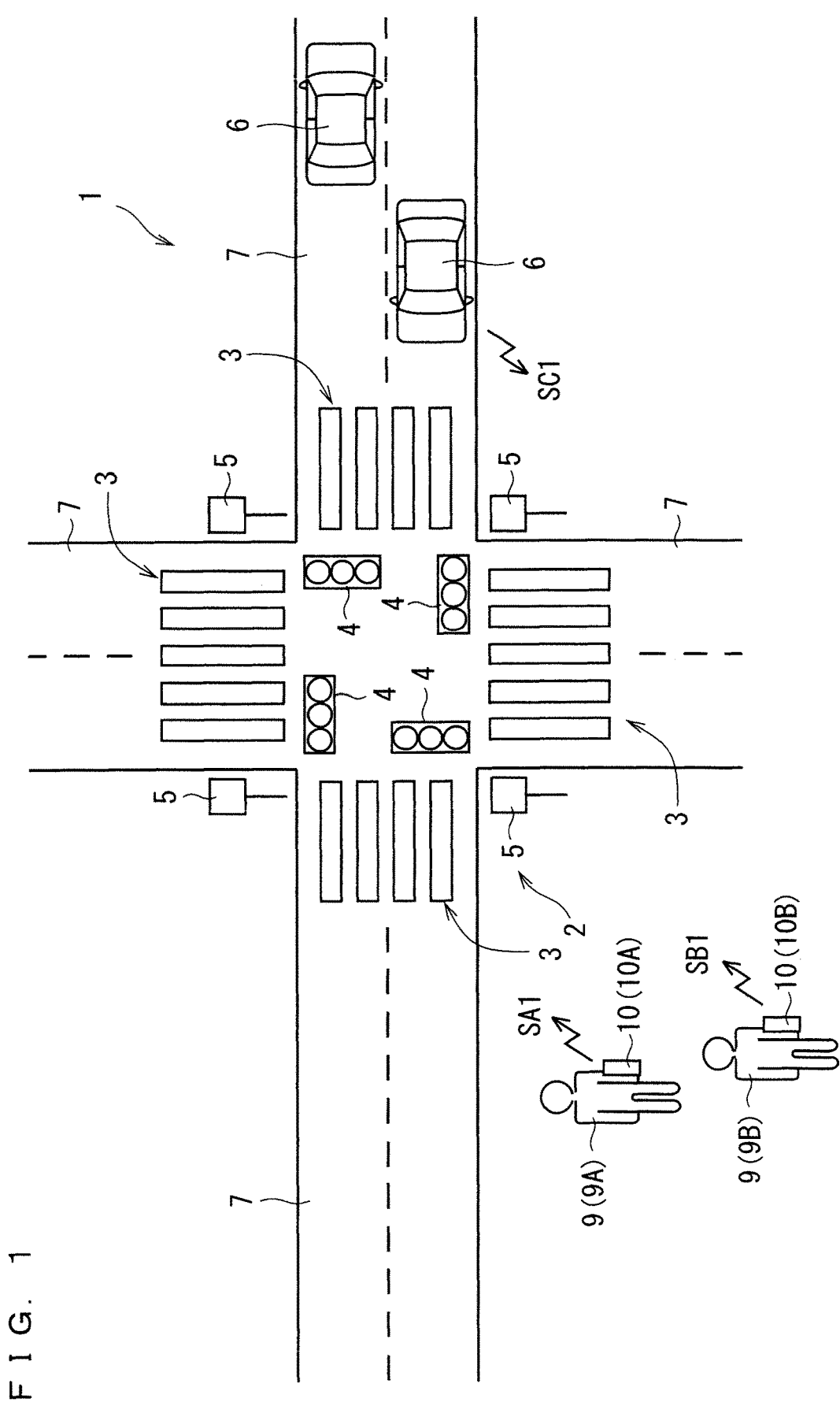
FIG. 1 is a diagram schematically illustrating an example system in which an electronic apparatus is used.

FIG. 1 is a diagram illustrating an example system in which an electronic apparatus 10 is used. The electronic apparatus 10 is a portable electronic apparatus, such as a smartphone, for instance. The electronic apparatus 10 can be used in intelligent transport systems (ITS), specifically, in a safe-driving assistance communication system 1. The safe-driving assistance communication system 1 is called a safe-driving assistance system or a safe-driving assistance wireless system.

As illustrated in FIG. 1, the safe-driving assistance communication system 1 enables mutual wireless communication between each roadside unit 5 at an intersection 2 or other places, each vehicle 6 (e.g., an automobile) traveling along a roadway 7, and the electronic apparatus 10 carried by each user 9 who is a pedestrian. The roadside unit 5, the vehicle 6, and the electronic apparatus 10 can thus exchange information with one another. The multiple vehicles 6 can perform wireless communication with one another. The vehicles 6 can thus exchange information with one another. The communication between the roadside unit 5 and the vehicle 6, the communication between the vehicles 6, the communication between the roadside unit 5 and the pedestrian's electronic apparatus 10, and the communication between the pedestrian's electronic apparatus 10 and the vehicle 6 are respectively called vehicle-to-roadside-infrastructure communication, vehicle-to-vehicle communication, pedestrian-to-roadside-infrastructure communication, and vehicle-to-pedestrian communication.

The roadside unit 5 can notify the vehicle 6 and electronic apparatus 10 of information about the lighting of a traffic light 4, information about traffic regulations, and other information pieces. The roadside unit 5 can also detect a nearby vehicle 6 and pedestrian. For instance, the roadside unit 5 at the intersection 2 can detect a pedestrian crossing a crosswalk 3. The roadside unit 5 can then notify the vehicle 6 and the electronic apparatus 10 of information about the detected vehicle 6 and pedestrian. The roadside unit 5 can also notify the other vehicles 6 and electronic apparatuses 10 of information sent from the vehicle 6 and information sent from the electronic apparatus 10.

The vehicle 6 can notify the other vehicles 6, roadside units 5, and electronic apparatuses 10 of information about the position, speed, and blinker of the vehicle 6. The vehicle 6 can then make various notifications (e.g., warnings) to the driver on the basis of notified information, thus assisting driver's safe driving. The vehicle 6 can make various notifications to the driver through a speaker, display device, and other means.

The electronic apparatus 10 can identify the state of the user 9 (hereinafter referred to as a user state). The electronic apparatus 10 can notify the roadside unit 5, vehicle 6, and other things of, for instance, information about the identified user state. For instance, the electronic apparatus 10 can identify that the user 9 is riding a bicycle, as the user state. The specific operation of the electronic apparatus 10 will be detailed later on. The electronic apparatus 10 at this time may notify the roadside unit 5, the vehicle 6, and other things of information that indicates this bicycle riding. Upon receiving the information, the vehicle 6 may notify the driver of the bicycle riding information. The driver can accordingly understand that the user 9 is riding a bicycle. The driver can thus drive while paying attention to the user 9.

In this way, the safe-driving assistance communication system 1 assists the driver's safe driving in the vehicle 6 through vehicle-to-roadside-infrastructure communication, vehicle-to-vehicle communication, pedestrian-to-roadside-infrastructure communication, and vehicle-to-pedestrian communication.

The safe-driving assistance communication system 1 can use a communication band of 760 MHz having a width of 9 MHz per channel. In other words, the roadside unit 5, the vehicle 6, and the electronic apparatus 10 can communicate with one another using this communication band. When there are few channels in this way, it is not desirable that a single apparatus (e.g., electronic apparatus 10) take up the communication band for a long time period. This is because other apparatuses (e.g., other electronic apparatuses 10) cannot transmit information. If the electronic apparatus 10 cannot transmit information, for instance, the vehicle 6 cannot receive information about the electronic apparatus 10 and cannot thus operate based on the information.

One embodiment contemplates reducing the traffic volume of the safe-driving assistance communication system 1 properly.

Figure 2:
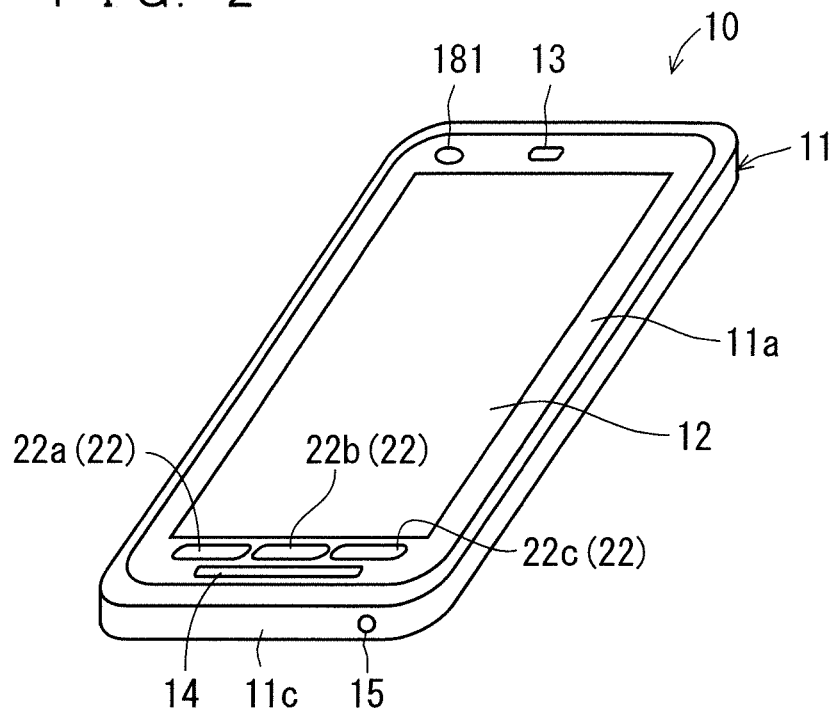
FIG. 2 is a diagram schematically illustrating an example appearance of the electronic apparatus.
Figure 3:
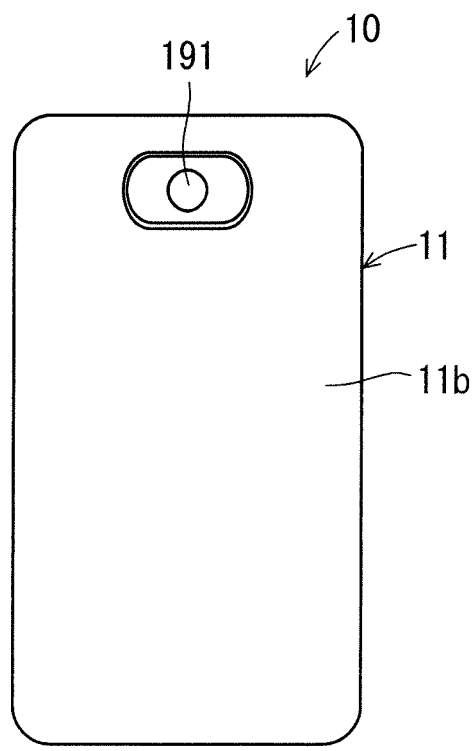
FIG. 3 is a diagram schematically illustrating an example appearance of the electronic apparatus.

FIG. 2 is a schematic perspective view of an example appearance of the electronic apparatus 10. FIG. 3 is a schematic diagram of the back surface of the electronic apparatus 10. As illustrated in FIGS. 2 and 3, the electronic apparatus 10 comprises an apparatus case 11 shaped in the form of, for instance, a substantially rectangular plate in plan view. The apparatus case 11 forms the exterior of the electronic apparatus 10.

The apparatus case 11 has a front surface 11a on which a display region 12 for displaying various information pieces, such characters, symbols, and graphics, is located. On the backside of the display region 12 is located a touch panel 130 (c.f., FIG. 4, which will be described later on). Accordingly, the user 9 can input various information pieces to the electronic apparatus 10 through operating the display region 12 on the front surface of the electronic apparatus 10 by finger or other means. It is noted that the user 9 can also input these various information pieces to the electronic apparatus 10 through operating the display region 12 by an operating means other than finger, for instance, with a touch-panel pen (e.g., stylus pen).

The apparatus case 11 has a receiver hole 13 located at the upper end of the front surface 11a. The apparatus case 11 has a speaker hole 14 located at the lower end of the front surface 11a. The apparatus case 11 has a microphone hole 15 located in a side surface 11c at the lower part of the apparatus case 11.

A lens 181 of a first camera 180, which will be described later on, is visible at the upper end of the front surface 11a of the apparatus case 11. As illustrated in FIG. 3, a lens 191 of a second camera 190, which will be described later on, is visible at the upper end of a back surface 11b of the apparatus case 11.

The electronic apparatus 10 comprises an operation button group 220 (c.f., FIG. 4, which will be described later on) consisting of a plurality of operation buttons 22. Each operation button 22 is a hardware button. To be specific, each operation button 22 is a press button. It is noted that at least one of the operation buttons 22 included in the operation button group 220 may be a software button displayed in the display region 12.

The operation button group 220 comprises operation buttons 22a, 22b and 22c located at the lower end of the front surface 11a of the apparatus case 11. The operation button group 220 also comprises a power button (not shown) and volume button (not shown) that are located on a surface of the apparatus case 11.

The operation button 22a is a back button for instance. The back button is an operation button for switching the display in the display region 12 to the immediately preceding display. The user 9 operates the operation button 22a to switch the display in the display region 12 to the immediately preceding display. The operation button 22b is a home button for instance. The home button is an operation button for displaying the home screen in the display region 12. The user 9 operates the operation button 22b to display the home screen in the display region 12. The operation button 22c is a history button for instance. The history button is an operation button for displaying, in the display region 12, the histories of applications executed in the electronic apparatus 10. The user 9 operates the operation button 22c to display, in the display region 12, the histories of the applications executed in the electronic apparatus 10.

Figure 4:
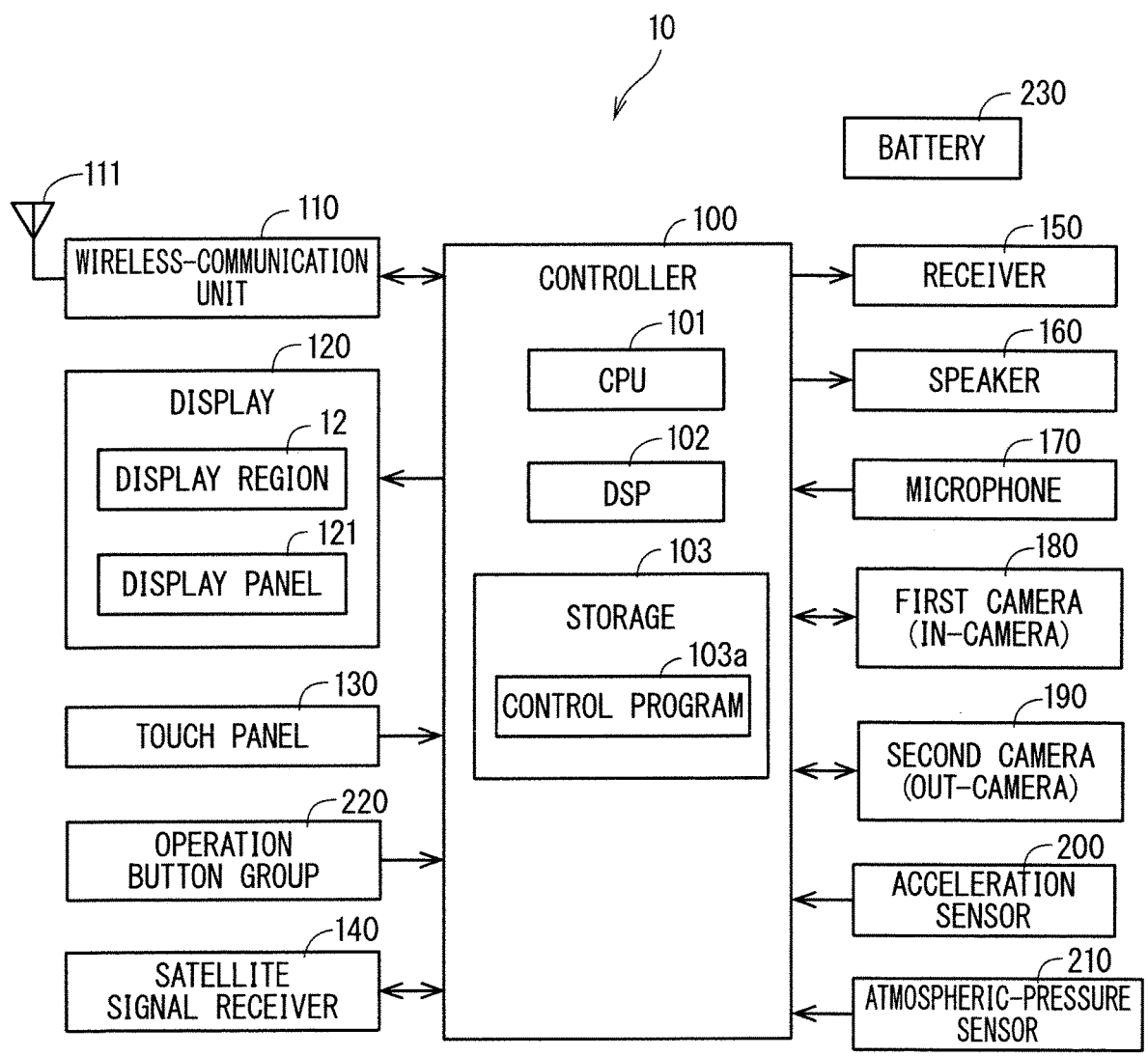
FIG. 4 is a block diagram schematically illustrating an example electrical configuration of the electronic apparatus.

FIG. 4 is a block diagram schematically illustrating an example electrical configuration of the electronic apparatus 10. As illustrated in FIG. 4, the electronic apparatus 10 comprises a controller 100, a wireless-communication unit 110, a display 120, the touch panel 130, and the operation button group 220. The electronic apparatus 10 further comprises a satellite signal receiver 140, a receiver 150, a speaker 160, a microphone 170, the first camera 180, the second camera 190, an acceleration sensor 200, an atmospheric-pressure sensor 210, and a battery 230. The apparatus case 11 contains these components of the electronic apparatus 10.

The controller 100 can manage the operation of the electronic apparatus 10 collectively by controlling the other components of the electronic apparatus 10. The controller 100 is considered also as a control circuit. The controller 100 comprises at least one processor to provide control and processing capabilities for executing various functions, as further detailed below.

In accordance with various embodiments, the at least one processor may be executed as a single integrated circuit (IC) or as multiple communicatively coupled ICs and/or discrete circuits. The at least one processor can be executed in accordance with various known techniques.

In one embodiment, the processor comprises one or more circuits or units configured to, by way of example, execute instructions stored in an associated memory, thus executing one or more data computation procedures or processes. In another embodiment, the processor may be firmware (e.g., a discrete logic component) configured to execute one or more data computation procedures or processes.

In accordance with various embodiments, the processor may comprise one or more processors, controllers, microprocessors, microcontrollers, application specific integrated circuits (ASICs), digital-signal processors, programmable logic devices, field programmable gate arrays, or any combination of these devices or structures, or any combination of other known devices and structures, to perform functions described below.

In the present example, the controller 100 comprises a central processing unit (CPU) 101, a digital signal processor (DSP) 102, and a storage. The storage 103 comprises a non-transitory storage medium readable by the CPU 101 and DSP 102, such as a read only memory (ROM) and random access memory (RAM). An example of the ROM in the storage 103 is a flash ROM (flash memory), which is a non-volatile memory. The storage 103 stores a plurality of control programs 103a and other things for controlling the electronic apparatus 10. The CPU 101 and the DSP 102 execute the various control programs 103a in the storage 103 to implement the various functions of the controller 100.

It is noted that the functions of the controller 100 in whole or in part may be implemented by a hardware circuit that needs no software to implement the functions. It is also noted that the storage 103 may comprise a non-transitory computer-readable storage medium other than a ROM and RAM. The storage 103 may comprise a compact hard disk drive, solid state drive (SSD) and other things for instance.

The control programs 103a in the storage 103 contain various applications (application programs). The storage 103 stores, for instance, a call application for performing a voice call and video call, a browser for displaying a website, and a mail application for creating, browsing, sending and receiving an e-mail. The storage 103 also stores a camera application for taking an object using the first camera 180 and second camera 190, a recorded-image display application for displaying static and dynamic images recorded in the storage 103, a music-reproduction control application for controlling the reproduction of music data recorded in the storage 103, and other applications. At least one of the applications in the storage 103 may be previously stored in the storage 103. The at least one of the applications in the storage 103 may also be downloaded from another device and then stored in the storage 103 by the electronic apparatus 10.

The electronic apparatus 10 may comprise a storage different from the storage 103. The aforementioned information pieces stored in the storage 103, or information pieces stored in the storage 103 described later on, may be stored in this different storage.

The wireless-communication unit 110 comprises an antenna 111. The wireless-communication unit 110 can perform wireless communication in multiple types of communication system using the antenna 111, for instance. The wireless-communication unit 110 performs wireless communication under the control of the controller 100.

The wireless-communication unit (i.e., communication circuit) 110 can perform wireless communication directly with the other electronic apparatus 10, roadside unit 5 and vehicle 6. For instance, the wireless-communication unit 110 can communicate with other electronic apparatuses 10, roadside units 5, and vehicles 6 using a communication band of 760 MHz having a width of 9 MHz. Hereinafter, a subject electronic apparatus 10 is referred to also as an electronic apparatus 10A, and another electronic apparatus 10 is referred to also as an electronic apparatus 10B. The user 9 of the electronic apparatus 10A is referred to also as a user 9A, and the user 9 of the electronic apparatus 10B is referred to also as a user 9B. For the electronic apparatus 10A, the electronic apparatus 10B corresponds to an external device. For the electronic apparatus 10B, the electronic apparatus 10A corresponds to an external device.

The wireless-communication unit 110 can perform wireless communication with a base station of a cellular phone system. The wireless-communication unit 110 can communicate with a cellular phone, web server and other things different from the electronic apparatus 10, through the base station and a network (e.g., the Internet). The wireless-communication unit 110 can also communicate with an access point provided on a wireless LAN. The wireless-communication unit 110 can communicate with the cellular phone, web server and other things different from the electronic apparatus 10, through the access point and network (e.g., the Internet). The electronic apparatus 10 can perform data communication and make an audio call and video call, for instance, with another cellular phone and other things.

The wireless-communication unit 110 performs various processes (e.g., an amplification process) on a signal received by the antenna 111, and outputs a reception signal as processed to the controller 100. The controller 100 performs various processes on the reception signal and acquires the information contained in the reception signal. The controller 100 also outputs a transmission signal containing the information to the wireless-communication unit 110. The wireless-communication unit 110 performs various processes (e.g., an amplification process) on the transmission signal, and transmits the transmission signal as processed, wirelessly from the antenna 111.

The display 120 comprises the display region 12, located on the front surface of the electronic apparatus 10, and a display panel 121. The display 120 can display various information pieces in the display region 12. The display panel 121 is a liquid-crystal display panel or organic EL panel for instance. Under the control of the controller 100, the display panel 121 can display various information pieces, such as characters, symbols, and graphics. The display panel 121 faces the display region 12 in the apparatus case 11. The information displayed on the display panel 121 is displayed in the display region 12.

The touch panel 130 can detect operations performed on the display region 12 by an operating means, such as a finger. The touch panel 130 is a projected capacitive touch panel for instance. The touch panel 130 is located on the backside of the display region 12. When the user 9 performs an operation on the display region 12 by an operating means, such as a finger, the touch panel 130 can output an electrical signal that complies with the operation, to the controller 100. In response to the electrical signal (output signal) from the touch panel 130, the controller 100 can identify the details of the operation performed on the display region 12. The controller 100 can then perform a process that complies with the identified operation details.

In response to an operation performed by the user 9, each operation button 22 of the operation button group 220 can output an operation signal that indicates that the operation button 22 has been operated. The controller 100 accordingly can determine whether the operation button 22 has been operated. The controller 100 that has received the operation signal controls the other component, so that the electronic apparatus 10 executes a function allocated to the operated operation button 22.

The satellite signal receiver 140 can receive a satellite signal transmitted by a positioning satellite. The satellite signal receiver 140 can then acquire position information about the electronic apparatus 10 on the basis of the received satellite signal. This position information comprises latitude and longitude that indicates the position of the electronic apparatus 10A for instance. The controller 100 can operate the satellite signal receiver 140 and stop the operation of the same. The satellite signal receiver 140 is considered also as a position information acquiring unit that can acquire position information that indicates the position of the electronic apparatus 10.

The satellite signal receiver 140 is a GPS receiver for instance, and can receive a wireless signal transmitted from a positioning satellite of global positioning system (GPS). The satellite signal receiver 140 calculates the current position of the electronic apparatus 10A in, for instance, latitude and longitude, on the basis of the received wireless signal, and outputs position information including the calculated latitude and longitude to the controller 100. The position information of the electronic apparatus 10 is considered as information about the position of the user 9A carrying the electronic apparatus 10A.

It is noted that the satellite signal receiver 140 may determine the position information about the electronic apparatus 10 on the basis of a signal transmitted from a positioning satellite of a global navigation satellite system (GNSS) other than GPS. For instance, the satellite signal receiver 140 may determine the position information about the electronic apparatus 10 on the basis of a signal from a positioning satellite of global navigation satellite system (GLONASS), Indian regional navigational satellite system (IRNSS), COMPASS, Galileo or quasi-zenith satellites system (QZSS).

The position information about the electronic apparatus 10 does not necessarily have to be acquired based on a wireless signal from a positioning satellite. For instance, upon receiving signals from a plurality of base stations, the position information acquiring unit may acquire the current position on the basis of the received signals. For instance, the position information acquiring unit may determine, as the position of the electronic apparatus 10, a position within a region in which wireless-communication zones of the base stations overlap each other. In this case, the controller 100, for instance, implements the function of the position information acquiring unit. The electronic apparatus 10 may use the first camera 180 or second camera 190 to acquire the position information. To be specific, the electronic apparatus 10 uses the first camera 180 or second camera 190 to acquire a landscape image around the electronic apparatus 10, including buildings, facilities, traffic signs, signboards, bills, plants, or other things. The electronic apparatus 10 may analyze the acquired landscape image, and acquire the current position of the electronic apparatus 10 on the basis of the feature identified through this image analysis. For instance, the electronic apparatus 10 may make, via the wireless-communication unit 110, an inquiry about a location that matches the feature identified through the image analysis, to a cloud server that relates position information (e.g., latitude and longitude) with the feature of the landscape image of a location corresponding to the position information and manages the position information and feature. The electronic apparatus 10 may receive the position information corresponding to the location, which matches the feature identified through the image analysis, from the cloud server. The electronic apparatus 10 may determine the current position based on the position information received from the cloud server. The electronic apparatus 10 may also acquire a landscape image around the electronic apparatus 10 via the wireless-communication unit 110 from, for instance, a glasses-like camera-equipped wearable terminal which a user is wearing, or a street camera near the user.

The microphone 170 can convert a sound received from outside the electronic apparatus 10 into an electrical audio signal (referred to as audio information) and output the audio signal to the controller 100. The sound from outside the electronic apparatus 10 is taken inside the electronic apparatus 10 from the microphone hole 15 to be input to the microphone 170.

The speaker 160 is a dynamic speaker for instance. The speaker 160 can convert an electrical audio signal sent from the controller 100, into a sound and output the sound to the outside. The sound from the speaker 160 is output from the speaker hole 14 to the outside. The user 9 can hear the sound emitted from the speaker hole 14 even at a place away from the electronic apparatus 10.

The receiver 150 can output a received sound. The speaker 150 is a dynamic speaker for instance. The speaker 150 can convert an electrical audio signal sent from the controller 100, into a sound and output the sound to the outside. The sound emitted from the speaker 150 is output from the receiver hole 13 to the outside. The volume of the sound emitted from the receiver hole 13 is set to be smaller than the volume of the sound from the speaker hole 14. The user 9A can hear the sound emitted from the receiver hole 13 by bringing his/her ear close to the receiver hole 13. It is noted that in place of the receiver 150, a vibration element may be provided, such as a piezoelectric vibration element for causing a portion of the front surface of the apparatus case 11 to vibrate. In this case, sound is transmitted to a user through the vibration of the portion of the front surface. The receiver hole 13 thus becomes unnecessary.

The first camera 180 comprises the lens 181, an image sensor, and other components. The second camera 190 comprises the lens 191, an image sensor, and other components. Each of the first camera 180 and second camera 190 can capture the image of an object under the control of the controller 100, generate a static image or dynamic image that indicates the captured object, and output the static image or dynamic image to the controller 100.

The lens 181 of the first camera 180 is visible from the front surface 11a of the apparatus case 11. The first camera 180 can thus capture the image of an object facing the front surface (i.e., display region 12) of the electronic apparatus 10. The first camera 180 is called an in-camera. The lens 191 of the second camera 190 is visible from the back surface 11b of the apparatus case 11. The second camera 190 can thus capture the image of an object facing the back surface of the electronic apparatus 10. The second camera 190 is called an out-camera.

The acceleration sensor 200 can detect the acceleration of the electronic apparatus 10, and output acceleration information that indicates the detected acceleration to the controller 100. The acceleration sensor 200 is a three-axis acceleration sensor. The acceleration sensor 200 can detect the acceleration of the electronic apparatus 10 in x-axis, y-axis, and z-axis directions. The x-axis, y-axis, and z-axis directions are respectively set to be the longer-side direction, shorter-side direction, and depth direction of the electronic apparatus 10 for instance.

The atmospheric-pressure sensor 210 can detect the atmospheric pressure around the electronic apparatus 10, and output atmospheric-pressure information that indicates the detected atmospheric pressure to the controller 100. It is noted that the electronic apparatus 10 may comprise a sensor other than the acceleration sensor 200 and atmospheric-pressure sensor 210. For instance, the electronic apparatus 10 may comprise at least one of an azimuth sensor, proximity sensor, illumination sensor, and gyroscope.

The battery 230 can output the power source of the electronic apparatus 10. The battery 230 is a rechargeable battery for instance. The power source emitted from the battery 230 is supplied to the various components of the electronic apparatus 10, such as the controller 100 and wireless-communication unit 110.

Figure 5:
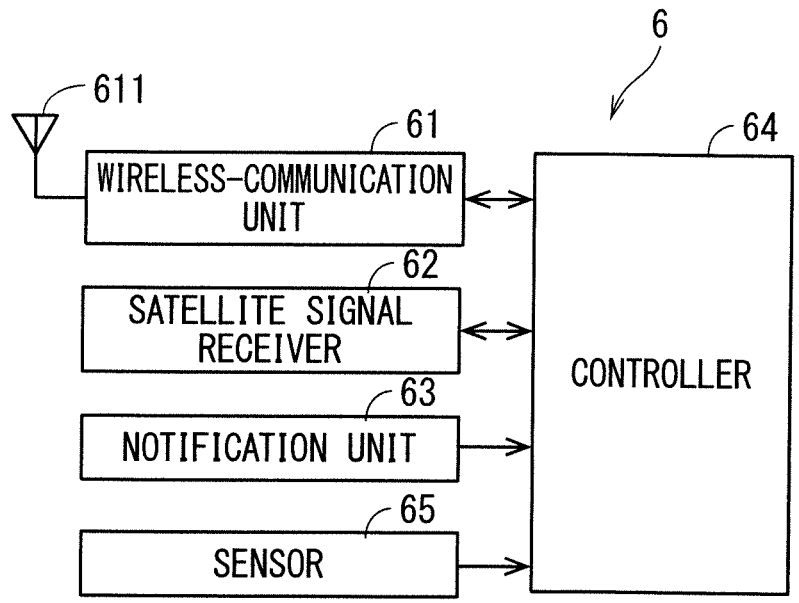
FIG. 5 is a block diagram schematically illustrating an example electrical configuration of a vehicle.

The following briefly describes the configuration of the vehicle 6 in the present application before describing the specific function and operation of the electronic apparatus 10. FIG. 5 is a block diagram schematically illustrating an example electrical configuration of the vehicle 6. The vehicle 6 comprises a wireless-communication unit 61, a satellite signal receiver 62, a notification unit 63, a controller 64, and a sensor 65.

The wireless-communication unit 61 comprises an antenna 611. The wireless-communication unit (i.e., communication circuit) 61 can perform wireless communication with the roadside unit 5, electronic apparatus 10, and other vehicle 6 using the antenna 611. For instance, the wireless-communication unit 61 can communicate with the electronic apparatus 10, roadside unit 5, and other vehicle 6 using a communication band of 760 MHz having a width of 9 MHz.

The satellite signal receiver 62 can receive a satellite signal transmitted by a positioning satellite, as is the case with the satellite signal receiver 140. The satellite signal receiver 62 can then acquire position information PC1 about the vehicle 6, on the basis of the received satellite signal. The satellite signal receiver 62 outputs the position information PC1 to the controller 64.

The notification unit 63 can make a notification to the driver. The notification unit 63 may comprise a display for instance. The notification unit 63 can notify the driver of information by controlling the display to display the information. Alternatively, the notification unit 63 may comprise an audio-output unit (e.g., speaker). The notification unit 63 can notify the driver of information by controlling the audio-output unit to output the information by sound.

The sensor 65 can detect various information pieces relating to the travel of the vehicle 6, and output the detected value to the controller 64. For instance, the sensor 65 detects the traveling speed of the vehicle 6 for instance. For instance, the sensor 65 may detect the rotation rate of the wheels and calculate the traveling speed based on the rotation rate.

The controller 64 can manage the operation of the vehicle 6 collectively. The hardware configuration of the controller 64, which is similar to that of the controller 100, will not be elaborated upon.

The controller 64 can wirelessly directly receive a signal from the electronic apparatus 10 via the wireless-communication unit 61. This signal reception indicates that the electronic apparatus 10 is located within the wireless-communication zone of the vehicle 6. Accordingly, upon receiving this signal, the controller 64 may notify the notification unit 63 that the user 9 is around the vehicle 6. Consequently, the drive can become aware of the user 9 around him/her, thus driving while paying attention to his/her surroundings.

The electronic apparatus 10 can transmit a signal, including position information that indicates the position of the electronic apparatus 10. The details will be described later on. The controller 64 that has received the signal may control the notification unit 63 to make a notification about the position information of the electronic apparatus 10. This enables the driver to recognize the position of the user 9.

The controller 64 can also transmit a signal SC1 to its surroundings via the wireless-communication unit 61 through one-to-many communication (e.g., broadcasting). The controller 64 can incorporate information pieces, such as identification information, classification information, and vehicle information, into the signal SC1. The identification information is information for identifying the vehicle 6. The classification information is information that indicates which of the roadside unit 5, vehicle 6, and electronic apparatus 10 is a transmission source. The vehicle information comprises information pieces, such as the position information PC1, indicating the position of the vehicle 6, and vehicle speed information that indicates a traveling speed VC1 of the vehicle 6.

The following describes the specific function and operation of the controller 100 of the electronic apparatus 10A. The controller 100 can transmit a signal SA1 to its surroundings via the wireless-communication unit 110 through one-to-many communication (e.g., broadcasting). The controller 100 can incorporate various information pieces, such as identification information and classification information, into the signal SA1. The identification information is information for identifying the electronic apparatus 10. The classification information is information that indicates which of the roadside unit 5, vehicle 6 and electronic apparatus 10 is a transmission source. The controller 100 may also incorporate position information PA1 received from the satellite signal receiver 140 into the signal SA1. This enables the electronic apparatus 10A to notify the surroundings of its position. The controller 100 may also acquire the traveling speed of the user 9A, and incorporate traveling-speed information that indicates this traveling speed into the signal SA1. For instance, the controller 100 may calculate the traveling speed based on time changes in the position of the user 9A, or calculate the traveling speed based on time integrals in the acceleration detected by the acceleration sensor 200. Transmitting the traveling-speed information enables the electronic apparatus 10A to notify its surroundings of the traveling speed of the user 9A.

Figure 6:
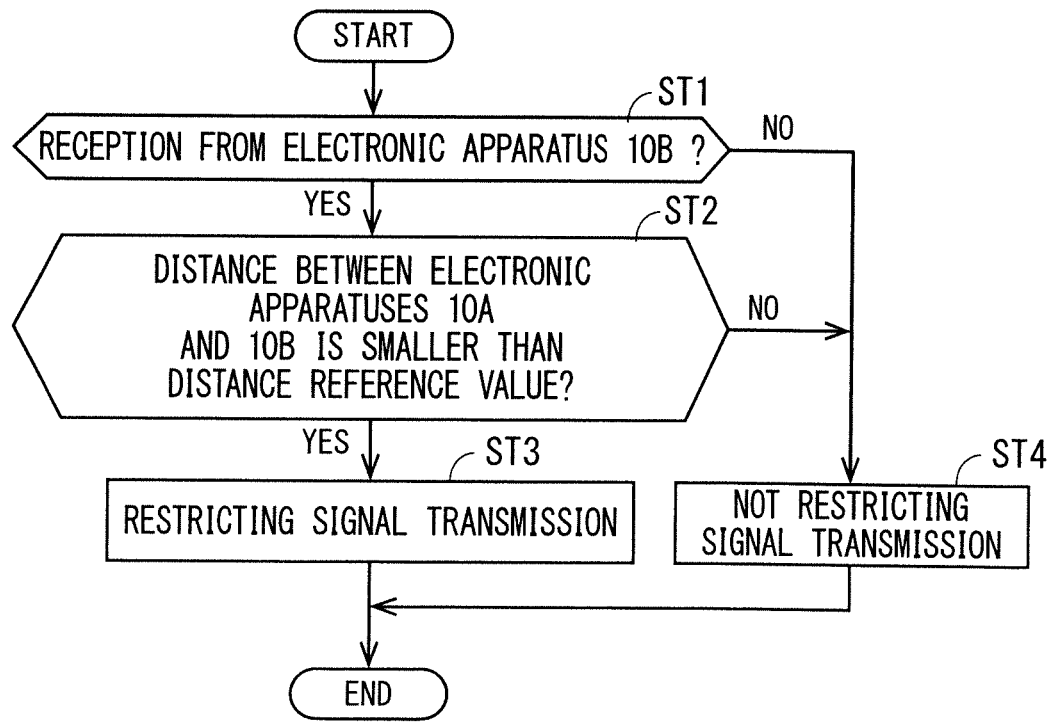
FIG. 6 is a flowchart illustrating an example operation of a controller.

The controller 100 performs a restricting process of restricting transmission of the signal SA1 under a predetermined condition. The details will be described later on. FIG. 6 is a flowchart illustrating an example operation of the controller 100. A series of process steps in FIG. 6 is executed for each predetermined time for instance. The following describes the functions of the controller 100 with reference to FIG. 6.

The controller 100 can directly receive, via the wireless-communication unit 110, a signal SB1 sent from the electronic apparatus 10B, when the electronic apparatus 10A is located within the wireless-communication zone of the electronic apparatus 10B. Referring to the example of FIG. 6, the controller 100, in step ST1, determines whether it has received the signal SB1 from the electronic apparatus 10B.

Upon determining reception of the signal SB1, the controller 100, in step ST2, makes a determination based on the signal SB1, about whether a distance D1 between the electronic apparatus 10A and 10B is shorter than a distance reference value Dref. The signal SB1 comprises, for instance, position information PB1 that indicates the position of the electronic apparatus 10B. This position information PB1 is considered also as information that indicates the position of the user 9B carrying the electronic apparatus 10B. The controller 100 moreover receives the position information PA1, indicating the position of the electronic apparatus 10A, from the satellite signal receiver 140. The controller 100 calculates the distance D1 between the electronic apparatus 10A and 10B on the basis of the position information PA1 and PB1. The controller 100 then compares the distance D1 with the distance reference value Dref to determine whether the distance D1 is shorter than the distance reference value Dref. The distance reference value Dref may be previously set and is stored in the storage 103, for instance.

Upon determining that the distance D1 is shorter than the distance reference value Dref, the controller 100, in step ST3, restricts transmission of the signal SA1 via the wireless-communication unit 110. To be specific, the controller 100 does not transmit the signal SA1 for instance.

Upon determining no reception of the signal SB1 (i.e., if NO in step ST1) or determining that the distance D1 is longer than the distance reference value Dref (i.e., if NO in step ST2), the controller 100, in step ST4, transmits the signal SA1 without restricting transmission of the signal SA1.

Figure 7:
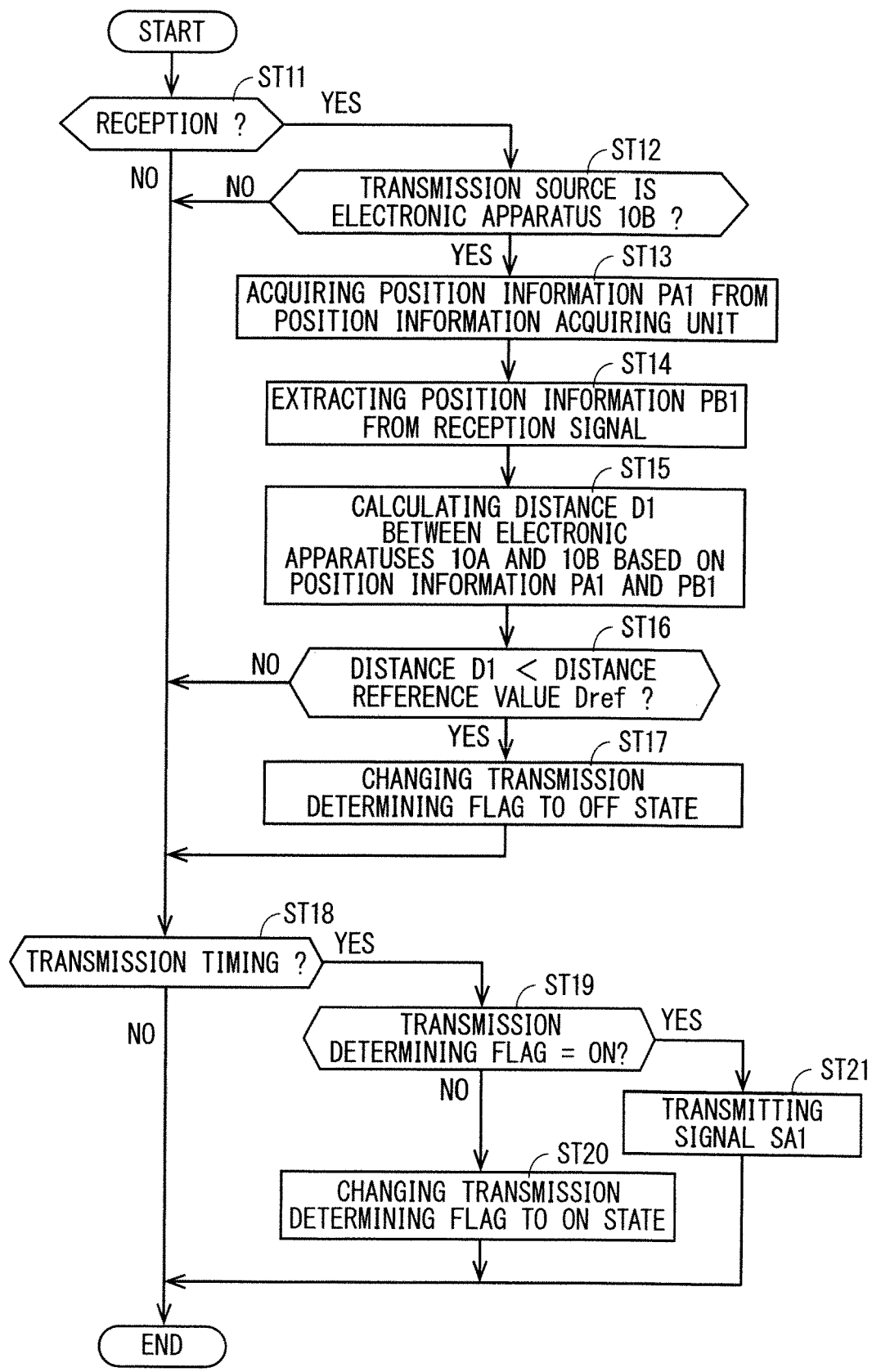
FIG. 7 is a flowchart illustrating an example operation of the controller.

FIG. 7 is a flowchart illustrating a further specific example operation of the electronic apparatus 10A. A series of process steps in FIG. 7 is executed for each predetermined time for instance. In this series of process steps, a transmission determining frag F1 is used. This transmission determining frag F1 is in ON state initially, which is stored in the storage 103.

In step ST11, the controller 100 first determines whether it has received a signal via the wireless-communication unit 110. Upon determining reception of the signal SB1, the controller 100, in step ST12, determines whether the transmission source of the signal SB1 is the electronic apparatus 10B on the basis of the signal. The signal SB1 comprises classification information that indicates the classification of the transmission source.

Upon determining that the transmission source is the electronic apparatus 10B, that is, upon determining reception of the signal SB1 from the electronic apparatus 10B, the controller 100, in step ST13, acquires the position information PA1 of the electronic apparatus 10A from the satellite signal receiver 140. In step ST14, the controller 100 next extracts the position information PB1 from the signal SB1. It is noted that step ST14 may come before step ST13.

In step ST15, the controller 100 next calculates the distance D1 between the electronic apparatuses 10A and 10B on the basis of the position information PA1 and PB1. In step ST16, the controller 100 next determines whether the distance D1 is shorter than the distance reference value Dref.

Upon determining no reception of the signal in step ST11, upon determining that the transmission source is not the electronic apparatus 10B in step ST12, or upon determining that the distance D1 is longer than the distance reference value Dref in step ST16, the controller 100 executes the process step of step ST18. In step ST18, the controller 100 determines whether now is the timing for transmitting the signal SA1. For instance, when an elapsed time from the last timing for transmitting the signal SA1 exceeds a predetermined time (e.g., about 100 milliseconds), the controller 100 may determine that now is the timing for transmitting the signal SA1. In the practical determination of such transmission timing, a signal-collision avoidance technique such as carrier sense multiple access/collision avoidance (CSMA/CA), is used, the details of which are not an essential part of the present application and will thus not be elaborated upon.

Upon determining that now is not the timing for transmitting the signal SA1, the controller 100 ends the process. Upon determining that now is the timing for transmitting the signal SA1 on the other hand, the controller 100, in step ST19, determines whether the transmission determining frag F1 is in ON state. Upon determining that the transmission determining frag F1 is in ON state, the controller 100, in step ST21, transmits the signal SA1 via the wireless-communication unit 110 through one-to-many communication (e.g., broadcasting). For instance, the controller 100 may transmit the signal SA1, including the position information PA1 from the satellite signal receiver 140. The controller 100 then ends the process.

Once receiving the signal SA1, the vehicle 6 can recognize that the user 9A is around the vehicle 6. Once the vehicle 6 notifies the driver of this information, the driver can also recognize that the user 9A is around the vehicle 6. The vehicle 6 can identify the position of the user 9A when the position information PA1 is included in the signal SA1, and the vehicle 6 notifies the driver of this information, thus enabling the driver to recognize the position of the user 9A immediately. While the vehicle 6 is in autonomous driving mode (e.g., autonomous driving mode corresponding to Level 3 to Level 5, which are defined under the SAE J3016 standard by the SAE international or society of automotive engineers international), the controller 100 can make a proper determination about control for accident avoidance, such as deceleration, on the basis of the received position information PA1 of the user 9A.

Upon determining that the distance D1 is shorter than the distance reference value Dref in step ST16, the controller 100, in step ST17, changes the transmission determining frag F1 to an OFF state. In other words, the transmission determining frag F1 changes to the OFF state when the electronic apparatus 10A is close to the electronic apparatus 10B that has transmitted the signal SB1 through one-to-many communication (e.g., broadcasting). To avoid redundant wording, the instance where the electronic apparatus 10A is close to the electronic apparatus 10B that has transmitted the signal SB1 through one-to-many communication (e.g., broadcasting), is hereinafter also referred to merely as an instance where the electronic apparatus 10A is close to the electronic apparatus 10B.

The process step of step ST18 is executed after the process step of step ST17. Upon determining that now is the transmission timing in step ST18, the controller 100, in step ST19, makes a determination about the transmission determining frag F1. Since the transmission determining frag F1 is in OFF state when the process step of step ST17 has been executed, the transmission determining frag F1 is determined to be in OFF state in step ST19. In step ST20, the controller 100 at this time changes the transmission determining frag F1 to the ON state and ends the process without executing step ST21.

According to the foregoing process, the electronic apparatus 10A that is close to the electronic apparatus 10B, does not transmit the signal SA1 even when now is the timing for transmitting the signal SA1. According to this fact, the electronic apparatus 10A does not transmit the signal SA1 in the following situation. That is, for an instance where the users 9A and 9B are together heading for the same destination, the users 9A and 9B are close to each other. When the electronic apparatus 10B of the user 9B transmits the signal SB1 in this situation, the electronic apparatus 10A of the user 9A does not transmit the signal SA1.

In this case, the vehicle 6 cannot receive the signal SA1, but can receive the signal SB1. The vehicle 6 can accordingly recognize that the user 9B is around the vehicle 6. The vehicle 6 notifies the driver of this information, thus enabling the driver to also recognize that the user 9B is around him/her. Since the users 9A and 9B are close to each other, the driver can see the user 9A together with the user 9B. In other words, when the users 9A and 9B are close to each other, the driver can recognize both the users 9A and 9B by only the signal SB1 from the electronic apparatus 10B.

Furthermore, the electronic apparatus 10A restricts transmission of the signal SA1, thus enabling reduction in the traffic volume of the safe-driving assistance communication system 1. This allows a signal to be transmitted that is easy to communicate for other devices and has higher priority than the signal SA1. Reducing traffic volume from the electronic apparatus 10A is particularly important when the roadside unit 5, vehicle 6, and electronic apparatus 10 communicate with one another at a low communication rate (e.g., with few channels).

As described above, when the electronic apparatus 10A is close to the electronic apparatus 10B, the presence of the user 9A can be notified to the surroundings substantially by the transmission of the signal SB1. In this case, the electronic apparatus 10A thus restricts transmission of the signal SA1 in order to reduce the traffic volume. In the other cases on the other hand, the electronic apparatus 10A transmits the signal SA1 to positively notify the surroundings of the presence of the user 9A. This enables the traffic volume of the safe-driving assistance system 1 to be reduced properly while minimizing or avoiding degradation in the traffic safety of the user 9A.

In some cases, the vehicle 6 determines whether to make a notification to the driver, on the basis of the position information of the electronic apparatus 10. For instance, the vehicle 6 makes a determination based on at least this information, about whether the electronic apparatus 10 is located ahead of the traveling direction of the vehicle 6, and upon making a positive determination, the vehicle 6 notifies the driver of the position of the electronic apparatus 10. This allows the driver to properly know information that should be highly recognized.

Upon receiving the signals SA1 and SB1, the vehicle 6 determines, for each of the position information PA1 and position information PB1, whether to provide the aforementioned notification. This enables the vehicle 6 to determine, for each of the users 9A and 9B, whether to provide the notification. On the other hand, since the electronic apparatus 10A does not transmit the signal SA1 when the users 9A and 9B are close to each other, the vehicle 6 uses the position information PB1 alone to determine whether to provide the notification. This reduces process steps in the vehicle 6. The vehicle 6 notifies the driver of the position of the user 9B in accordance with a determination that a notification should be provided, and in an effort to visually recognize the user 9B immediately in response to this notification, the driver can visually recognize the user 9A as well.

In the foregoing example, the controller 100 calculates the distance D1 based on the position information PA1 and PB1. Consequently, the distance D1 can be calculated with relatively high accuracy. By extension, the controller 100 can make a determination about distance, i.e., whether the distance D1 is shorter than the distance reference value Dref, with relatively high accuracy. Such distance determination is provided by way of example. The following describes another example of the distance determination.

The controller 100 may determine whether the distance D1 is shorter than the distance reference value Dref, on the basis of the receiving intensity (i.e., power) of the signal SB1. The receiving intensity tends to get higher as the distance D1 gets shorter. To be specific, the controller 100 may determine whether the receiving intensity of the signal SB1 is higher than a reception reference value, and upon determining that the receiving intensity is higher than the reception reference value, the controller 100 may determine that the distance D1 is shorter than the distance reference value Dref. The reception reference value may be set previously, and stored in the storage 103 or other places for instance.

Figure 8:
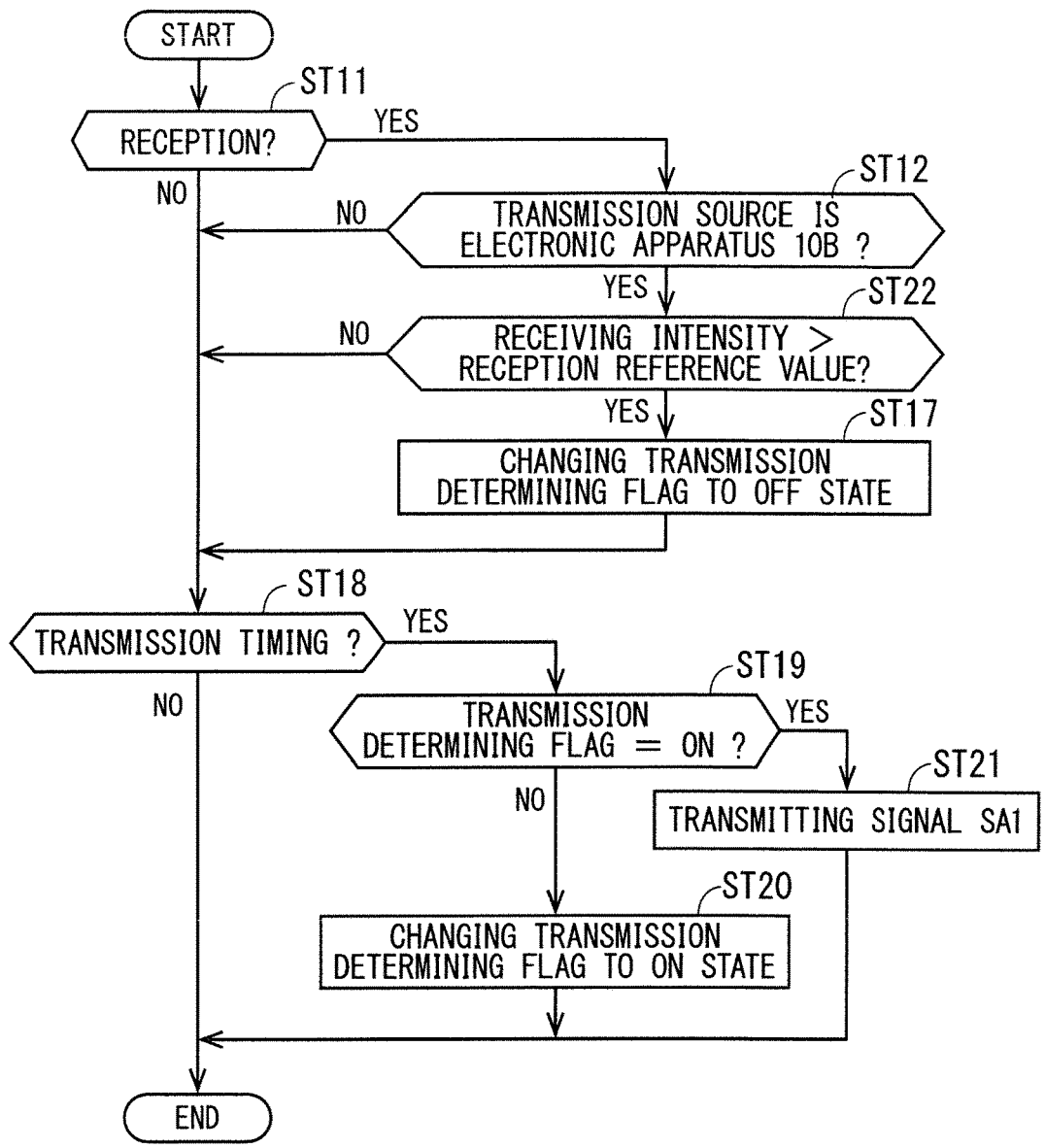
FIG. 8 is a flowchart illustrating an example operation of the controller.

FIG. 8 is a flowchart illustrating an example operation of the controller 100. When compared with FIG. 7, FIG. 8 provides step ST22 instead of a set of the process steps of steps ST13 to ST16. Step ST22 is executed in response to a determination in step ST12 that the transmission source is the electronic apparatus 10B. In step ST22, the controller 100 determines whether the receiving intensity of the signal SB1 is higher than a reception reference value. Upon determining that the receiving intensity is higher than the reception reference value, the controller 100 executes the process step of step ST17. Upon determining that the receiving intensity is lower than the reception reference value, the controller 100 executes the process step of step ST18 without executing the process step of step ST17.

Through these process steps, the electronic apparatus 10A restricts transmission of the signal SA1 when the electronic apparatus 10A is close to the electronic apparatus 10B that transmits the signal SB1 through one-to-many communication (e.g., broadcasting). This enables the traffic volume of the safe-driving assistance system 1 to be reduced properly while minimizing or avoiding degradation in the traffic safety.

The larger the distance reference value Dref is, the more frequently the electronic apparatus 10A restricts transmission of the signal SA1. Hence, the distance reference value Dref needs to be set to be large in order to reduce the traffic volume.

On the other hand, the electronic apparatus 10A that is away from the electronic apparatus 10B restricts transmission of the signal SA1 as the distance reference value Dref increases. In other words, the electronic apparatus 10A restricts transmission of the signal SA1 even when the user 9A is away from the user 9B. When the users 9A and 9B are away from each other, the driver of the vehicle 6 can be likely to overlook the user 9A though he/she can successfully recognize the user 9B by eye. In other words, the presence of the user 9A can be likely to be missed from the driver's recognition. Hence, the distance reference value Dref needs to be set in order to notify the presence of the user 9A properly.

When the vehicle 6 is far away from the user 9A, the vehicle 6 has a small chance of colliding against the user 9A immediately after this moment. In this case, problems are thus less likely to arise even when the driver fails to recognize the user 9A. In view of this fact, the distance reference value Dref may be set as indicated below.

That is, the controller 100 may set the distance reference value Dref in such a manner that the distance reference value Dref increases as the distance D2 between the electronic apparatus 10A and the vehicle 6 increases. The controller 100 can acquire the distance D2 in the following example way. That is, the controller 100 first receives the signal SC1 from the vehicle 6 via the wireless-communication unit 110. This signal SC1 comprises the position information PC1, indicating the position of the vehicle 6, as vehicle information. The controller 100 moreover receives the position information PA1 of the electronic apparatus 10A from the satellite signal receiver 140. The controller 100 calculates the distance D2 between the electronic apparatus 10A and the vehicle 6 on the basis of the position information PA1 and PC1.

Figure 9:
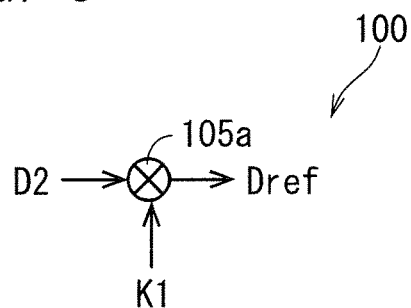
FIG. 9 is a diagram schematically illustrating an example configuration of the controller that sets a distance reference value.

FIG. 9 is a diagram schematically illustrating an example configuration of the controller 100 that sets the distance reference value Dref. In the example of FIG. 9, the controller 100 comprises a multiplier 105a. The multiplier 105a receives the distance D2 and a predetermined value K1. The predetermined value K1 is stored in the storage 103 for instance. The multiplier 105a multiplies the distance D2 by the predetermined value K1, and outputs the resulting value as the distance reference value Dref. This multiplication is expressed by the following expression.

$$D\mathrm{ref}=K1 \cdot D2 \quad (1)$$

When the predetermined value K1 is equal to one, the multiplier 105a is unnecessary. This holds true for the other multipliers that will be described later on.

Figure 10:
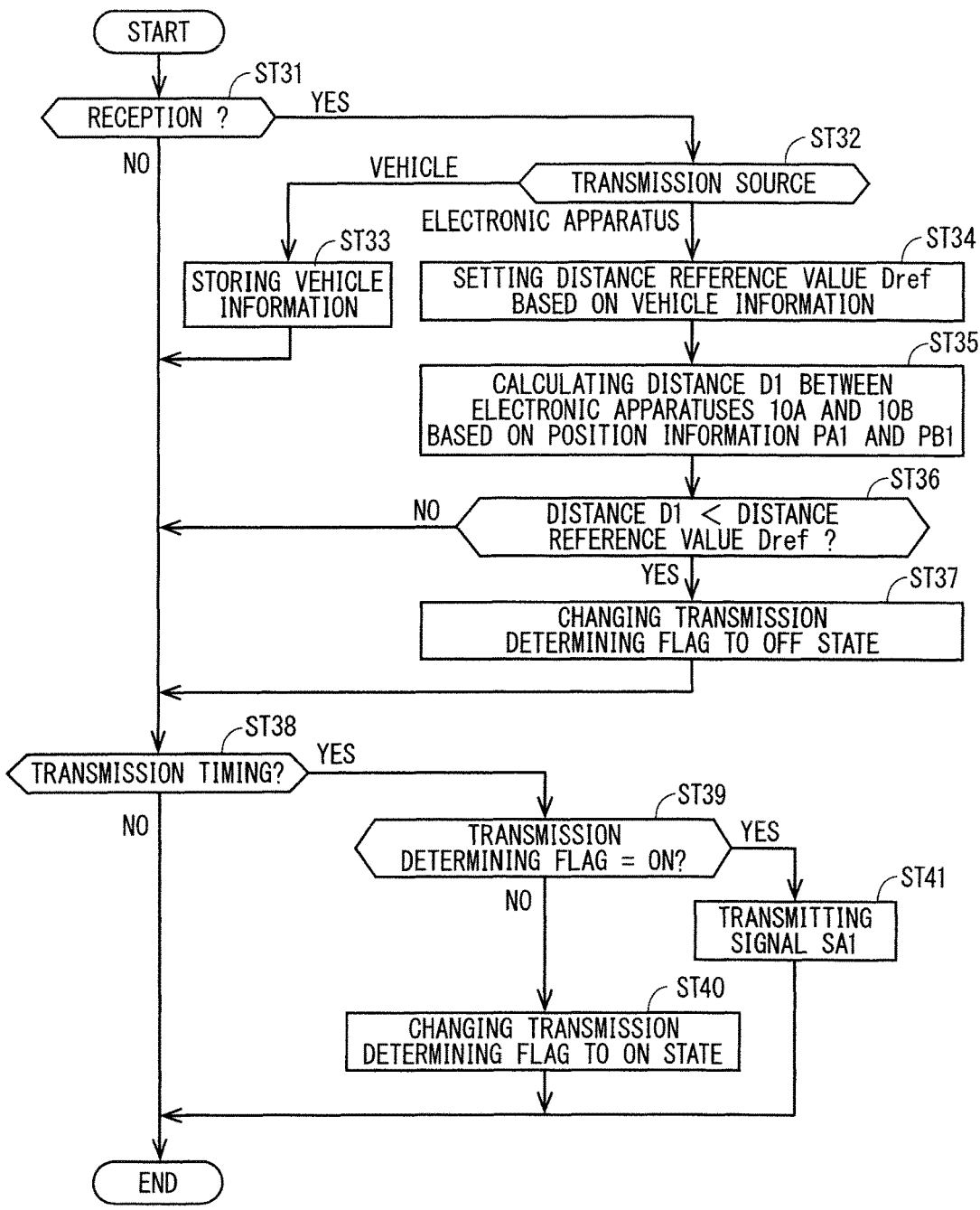
FIG. 10 is a flowchart illustrating an example operation of the controller.

FIG. 10 is a flowchart illustrating an example operation of the controller 100. A series of process steps in FIG. 10 is executed for each predetermined time for instance. In step ST31, the controller 100 determines whether it has received a signal. Upon determining no reception of the signal, the controller 100 executes steps ST38 to ST41. Steps ST38 to ST41 are respectively the same as steps ST18 to ST21 in FIG. 7.

Upon determining reception of the signal in step ST31, the controller 100 determines the classification of the transmission source in step ST32. The controller 100 determines the classification of the transmission source on the basis of the classification information included in the signal. Upon determining that the transmission source is the vehicle 6, the controller 100, in step ST33, stores, in the storage 103, the vehicle information included in the signal SC1. To be specific, the storage 103 stores the position information PC1 of the vehicle 6. When the storage 103 has already stored the vehicle information, the controller 100 may update and store this vehicle information. The controller 100 next executes the process steps of steps ST38 to ST41.

Upon determining that the transmission source is the electronic apparatus 10 in step ST32, the controller 100, in step ST34, sets the distance reference value Dref based on the vehicle information stored in the storage 103. For instance, the controller 100 first acquires the position information PA1 from the satellite signal receiver 140 and reads the latest position information PC1 from the storage 103. The controller 100 then calculates the distance D2 between the electronic apparatus 10A and the vehicle 6 on the basis of the position information PA1 and PC1, and sets the distance reference value Dref in such a manner that the distance reference value Dref increases as the distance D2 increases. For instance, the controller 100 sets the distance reference value Dref using Expression (1).

In step ST35, the controller 100 next calculates the distance D1 between the electronic apparatuses 10A and 10B. This calculation is performed in a manner similar to that performed through steps ST13 to ST15 illustrated in FIG. 7. It is noted that step ST35 may come before step ST34.

In step ST36, the controller 100 next determines whether the distance D1 calculated in step ST35 is shorter than the distance reference value Dref specified in step ST34. Upon determining that the distance D1 is shorter than the distance reference value Dref, the controller 100, in step ST37, changes the transmission determining frag F1 to the OFF state and then executes the process step of step ST38. Upon determining that the distance D1 is longer than the distance reference value Dref, the controller 100 executes the process step of step ST38 without executing the process step of step ST37.

According to the foregoing, the distance reference value Dref is set to be relatively large when the vehicle 6 is far away from the user 9A (see FIG. 9 as well) The electronic apparatus 10A restricts transmission of the signal SA1 even when the user 9A is relatively away from the user 9B (i.e., if YES in step ST36). This improves the frequency of restricting transmission of the signal SA1, thereby further reducing the traffic volume of the safe-driving assistance system 1. Further, the traffic safety is less likely to degrade even when the electronic apparatus 10A restricts transmission of the signal SA1, because the vehicle 6 is far away from the user 9A.

The distance reference value Dref at the time when the vehicle 6 is close to the user 9A, is set to be smaller than the distance reference value Dref at the time when the vehicle 6 is far away from the user 9A (see FIG. 9 as well). Accordingly, the electronic apparatus 10A transmits the signal SA1 when the users 9A and 9B are relatively away from each other (i.e., if NO in step ST36). In other words, the electronic apparatus 10A at this time positively notifies the vehicle 6 of the presence of the user 9A. The electronic apparatus 10A consequently achieves improved traffic safety of the user 9A.

In the foregoing specific example, the controller 100 continuously changes the distance reference value Dref in accordance with the distance D2. Nevertheless, the controller 100 may change the distance reference value Dref discontinuously. For instance, the distance reference value Dref may be set at a first value when the distance D2 is shorter than a predetermined value. In addition, the distance reference value Dref may be set at a second value larger than the first value, when the distance D2 is longer than the predetermined value. This holds true for the other methods of setting the distance reference value Dref that are described below.

The controller 100, which cannot receive the signal SC1 when the vehicle 6 is not around the electronic apparatus 10A, cannot calculate the distance D2 between the user 9A and the vehicle 6. Accordingly, the controller 100 needs to set the distance reference value Dref at a predetermined maximum value when the controller 100 cannot receive the signal SC1. This holds true for the other methods of setting the distance reference value Dref that are described below.

As a specific example operation, the controller 100 deletes the vehicle information from the storage 103 when failing to receive the signal SC1 for more than a predetermined time period. In step ST34, the controller 100 then sets the distance reference value Dref at the maximum value when the vehicle information is not stored in the storage 103.

It is noted that the distance D2 herein may be a straight-line distance or curved-line distance. The curved-line distance can be calculated based on map information. This map information may be stored in the storage 103 for instance. The map information comprises road data consisting of link data and node data. The node data indicates points at which each road intersects, branches, and merges. The link data indicates a road section between nodes. The link data comprises information pieces, such as an identification number for identifying a road in each section, a road length that indicates the length of the road in each section, and the coordinates of the start and end points of the road in each section (e.g., latitude and longitude). The node data comprises information pieces, such as an identification number for identifying a node, the coordinates of the node, and an identification number of a road connected to the node. The map information may be stored in the storage 103 previously or acquired from an external server or other places. For instance, the controller 100 may employ the shortest curved-line distance between the user 9A and the vehicle 6 as the distance D2 on the basis of the position information PA1 and PC1 and of the map information.

The vehicle 6, when traveling at a low traveling speed VC1, takes a long time to reach the user 9A. In this case, problems are thus less likely to arise even when the driver fails to recognize the user 9A. In view of this fact, the distance reference value Dref may be set as indicated below.

That is, the controller 100 may set the distance reference value Dref in such a manner that the distance reference value Dref increases as the traveling speed VC1 of the vehicle 6 decreases. The vehicle speed information indicating the traveling speed VC1 may be included in the signal SC1 sent from the vehicle 6, as one of the vehicle information. Alternatively, the controller 100 may calculate the traveling speed VC1 based on time changes in the position information PC1 of the vehicle 6. To be specific, the controller 100, every time it receives the signal SC1, relates a time of the reception of the signal SC1 with the position information PC1 included in the signal SC1, and stores these data pieces in the storage 103. The controller 100 then calculates the traveling speed VC1 based on chronological data of these data pieces. In this point of view, the position information PC1, which is repeatedly received, is considered also as information that indicates the traveling speed VC1 of the vehicle 6.

Figure 11:
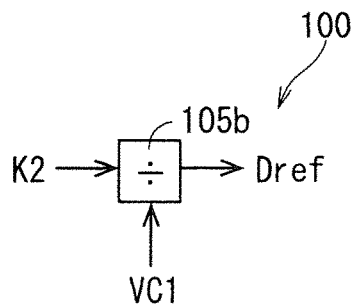
FIG. 11 is a diagram schematically illustrating an example configuration of the controller that sets a distance reference value.

FIG. 11 is a diagram schematically illustrating an example configuration of the controller 100 that sets the distance reference value Dref. In the example of FIG. 11, the controller 100 comprises a divider 105b. The divider 105b receives the traveling speed VC1 and a predetermined value K2. The predetermined value K2 is stored in the storage 103 for instance. The divider 105b divides the predetermined value K2 by the traveling speed VC1, and outputs the resulting value (K2/VC1) as the distance reference value Dref. This division is expressed by the following expression.

$$Dref = K2/VC1 \qquad (2)$$

The flowchart illustrating an example operation of the controller 100 is the same as that in FIG. 10 with the following exception. That is, in step ST33, the controller 100 stores the vehicle speed information (i.e., traveling speed VC1) as the vehicle information, and in step ST34, the controller 100 sets the distance reference value Dref based on the traveling speed VC1 as described above.

Accordingly, the distance reference value Dref is set to be relatively large when the traveling speed VC1 of the vehicle 6 is low. Thus, the electronic apparatus 10A at this time restricts transmission of the signal SA1 even when the user 9A is relatively away from the user 9B. This improves the frequency of restricting transmission of the signal SA1, thereby further reducing the traffic volume of the safe-driving assistance system 1. In addition, the vehicle 6 takes a relatively long time to reach the user 9A even when the electronic apparatus 10A restricts transmission of the signal SA1, because the traveling speed VC1 of the vehicle 6 is low. The traffic safety of the user 9A is hence less likely to degrade.

The distance reference value Dref at the time when the traveling speed VC1 of the vehicle 6 is high, is smaller than the distance reference value Dref at the time when the traveling speed VC1 is low. The electronic apparatus 10A thus transmits the signal SA1 when the users 9A and 9B are relatively away from each other. In other words, the electronic apparatus 10A itself transmits the signal SA1 to positively notify the surroundings of the presence of the user 9A. This enables the electronic apparatus 10A to improve the traffic safety of the user 9A.

When the vehicle 6 takes a long time to reach the user 9A, the vehicle 6 has a small chance of colliding against the user 9A immediately after this moment. In this case, problems are thus less likely to arise even when the driver fails to recognize the user 9A. In view of this fact, the distance reference value Dref may be set as indicated below.

The controller 100 may set the distance reference value Dref in such a manner that the distance reference value Dref increases as an expected time necessary for the vehicle 6 to reach the user 9A increases. Hereinafter, this expected time is also referred to as an expected necessary time TC1. For instance, the controller 100 may calculate the expected necessary time TC1 based on the distance D2 and traveling speed VC1. To be specific, the controller 100 may calculate the expected necessary time TC2 by dividing the distance D2 by the traveling speed VC1.

Figure 12:
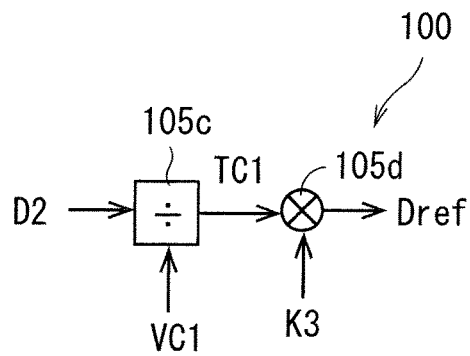
FIG. 12 is a diagram schematically illustrating an example configuration of the controller that sets a distance reference value.

FIG. 12 is a diagram schematically illustrating an example configuration of the controller 100 that sets the distance reference value Dref. In the example of FIG. 12, the controller 100 comprises a divider 105c and a multiplier 105d. The divider 105c receives the distance D2 and traveling speed VC1. The divider 105c divides the distance D2 by the traveling speed VC1, and outputs the resulting value (D2/VC1) to the multiplier 105d as the expected necessary time TC1. The multiplier 105d receives a predetermined value K3 as well. The predetermined value K3 is stored in the storage 103 for instance. The multiplier 105d multiplies the expected necessary time TC1 by the predetermined value K3, and outputs the resulting value as the distance reference value Dref. This multiplication and division is expressed by the following expression.

$$Dref=K3 \cdot D2/VC1 \quad (3)$$

The flowchart illustrating an example operation of the controller 100 is the same as that in FIG. 10 with the following exception. That is, in step ST33, the controller 100 stores the position information PC1 and the vehicle speed information (i.e., traveling speed VC1) as the vehicle information, and in step ST34, the controller 100 sets the distance reference value Dref based on the position of the user 9A and vehicle 6 (i.e., more specifically, the distance D2 between the user 9A and the vehicle 6) and on the traveling speed VC1.

Accordingly, the distance reference value Dref is set to be relatively large when the expected necessary time TC1, which is an expected time necessary for the vehicle 6 to reach the user 9A, is long. The electronic apparatus 10A thus restricts transmission of the signal SA1 even when the user 9A is relatively away from the user 9B. This improves the frequency of restricting transmission of the signal SA1, thereby further reducing the traffic volume of the safe-driving assistance system 1. In addition, the traffic safety of the user 9A is less likely to degrade even when the electronic apparatus 10A restricts transmission of the signal SA1, because the expected necessary time TC1 is long.

The distance reference value Dref at the time when the expected necessary time TC1 is long, is smaller than the distance reference value Dref at the time when the traveling speed VC1 is low. The electronic apparatus 10A thus transmits the signal SA1 when the user 9A is relatively away from the user 9B. In other words, the electronic apparatus 10A itself transmits the signal SA1 to positively notify its surroundings of the presence of the user 9A. This enables the electronic apparatus 10A to improve the traffic safety of the user 9A.

When a traveling speed VB1 of the user 9B is high, the driver of the vehicle 6 seems to pay attention to the user 9B within a relatively wide range. In other words, for the user 9B moving slowly, the driver seems to pay attention to the vicinity of the user 9B (i.e., a relatively narrow range), whereas for the user 9B moving fast, the driver seems to pay attention to a relatively wide range. In view of this fact, the distance reference value Dref may be set as indicated below.

The controller 100 may set the distance reference value Dref in such a manner that the distance reference value Dref increases as the traveling speed VB1 of the user 9B increases. For instance, the signal SB1 from the electronic apparatus 10B may comprise traveling-speed information that indicates the traveling speed VB1 of the user 9B. Alternatively, the controller 100 may calculate the traveling speed VB1 based on time changes in the position information PB1 included in the signal SB1. The position information PB1, which is repeatedly received, is considered also as information that indicates the traveling speed VB1 of the user 9B.

Figure 13:
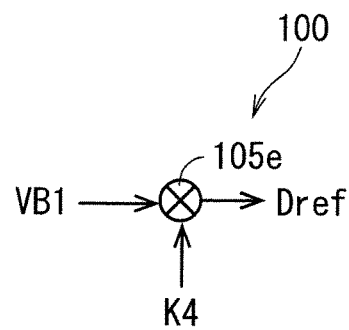
FIG. 13 is a diagram schematically illustrating an example configuration of the controller that sets a distance reference value.

FIG. 13 is a diagram schematically illustrating an example configuration of the controller 100 that sets the distance reference value Dref. In the example of FIG. 13, the controller 100 comprises a multiplier 105e. The multiplier 105e receives the traveling speed VB1 and a predetermined value K4. The predetermined value K4 is stored in the storage 103 for instance. The multiplier 105e multiplies the traveling speed VB1 by the predetermined value K4, and outputs the resulting value as the distance reference value Dref. This multiplication is expressed by the following expression.

$$Dref=K4 \cdot VB1 \quad (4)$$

The traveling speed VB1 at which the user 9B is running, is higher than the traveling speed VB1 at which the user 9B is walking. In addition, the traveling speed VB1 at which the user 9B is walking, is higher than the traveling speed VB1 (=0) at which the user 9B is stopping. Accordingly, the controller 100 may set the distance reference value Dref in accordance with the user state of the user 9B. The user state herein comprises a user state of stopping, a user state of walking, and a user state of running.

State information that indicates the user state of the user 9B may be included in the signal SB1 transmitted by the electronic apparatus 10B. In other words, the electronic apparatus 10B may identify the user state of the user 9B, and may transmit the signal SB1 including the state information indicating the identified user state, to the surroundings.

The user state of the user 9B is identified based on the acceleration of the electronic apparatus 10B for instance. It is known that the acceleration of the electronic apparatus 10B indicates a characteristic pattern of time changes according to the individual user state of the user 9B carrying the electronic apparatus 10B. To be specific, this acceleration varies with time periodically in accordance with the user state.

The storage 103 of the electronic apparatus 10B stores a typical pattern of the acceleration according to an individual user state, as an entered pattern. The controller 100 of the electronic apparatus 10B determines whether a pattern of time changes in the acceleration detected by the acceleration sensor 200 (hereinafter, referred to as a detected pattern), indicates an entered pattern for a predetermined state. For instance, when the sum total of the absolute values of differences between a detected pattern and entered pattern at individual time points is equal to a predetermined reference value, the controller 100 of the electronic apparatus 10B determines that the detected pattern indicates the entered pattern. For a detected pattern that indicates an entered pattern for a state of walking, for instance, the controller 100 identifies that the user state of the user 9B is a state of walking. Further, for a small amount of time change in the acceleration, the controller 100 of the electronic apparatus 10B can identify that the user state of the user 9B is a state of stopping.

The controller 100 of the electronic apparatus 10A that has received the signal SB1 may set the distance reference value Dref in accordance with the user state of the user 9B. To be specific, the controller 100 may set the distance reference value Dref in such a manner that the distance reference value Dref in the user state of the user 9B being a state of running, is larger than the distance reference value Dref in the user state being a state of walking. In addition, the controller 100 may set the distance reference value Dref in such a manner that the distance reference value Dref in the user state being a state of walking, is larger than the distance reference value Dref in the user state being a state of stopping.

Figure 14:
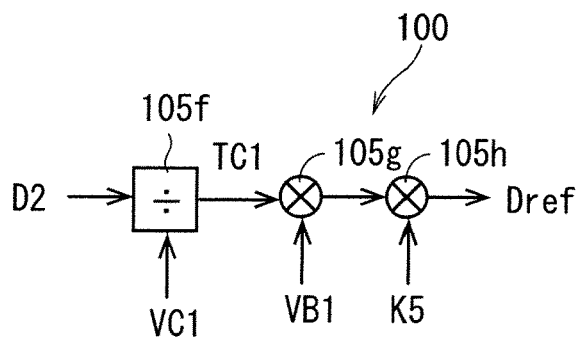
FIG. 14 is a diagram schematically illustrating an example configuration of the controller that sets a distance reference value.

The controller 100 may set the distance reference value Dref based on the traveling speed VB1 of the user 9B and on the expected necessary time TC1 of the vehicle 6. FIG. 14 is a diagram schematically illustrating an example configuration of the controller 100 that sets the distance reference value Dref. In the example of FIG. 11, the controller 100 comprises a divider 105f and multipliers 105g and 105h.

The divider 105*f* receives the distance D2 and travel speed VC1. The divider 105*f* divides the distance D2 by the travel speed VC1, and outputs the resulting value (i.e., expected necessary time TC1) to the multiplier 105*g*. The multiplier 105*g* receives the traveling speed VB1 as well. The multiplier 105*g* multiplies the expected necessary time TC1 by the traveling speed VB1, and outputs the resulting value to the multiplier 105*h*. The multiplier 105*h* receives a predetermined value K5 as well. The predetermined value K5 is stored in the storage 103 for instance. The multiplier 105*h* multiplies the value calculated by the multiplier 105*g*, by the predetermined value K5, and outputs the resulting value as the distance reference value Dref. This multiplication and division is expressed by the following expression.

$$Dref = K5 \cdot D2 \cdot VB1/VC1 \quad (5)$$

The electronic apparatus 10A receives multiple signals SC1 from a plurality of vehicles 6 in some cases. In these cases, the controller 100 may employ, as the distance reference value Dref, the smallest one of the distance reference values Dref that are set based on the pieces of vehicle information of the individual vehicles. The following describes an instance in which the distance reference value Dref is set based on the distance D2 between the user 9A and the vehicle 6. The vehicles 6 herein are considered as the vehicles 6A and 6B.

The controller 100 stores the vehicle information included in the signal SC1, in the storage 103 for each vehicle 6. To be specific, the controller 100 relates the identification information and vehicle information of the vehicle 6 with each other to store these information pieces in the storage 103. This identification information is included in the signal SC1. The controller 100 relates the identification information and position information PC1 (hereinafter referred to as position information PC11) included in the signal SC1 sent from the vehicle 6A, with each other to store these information pieces in the storage 103, and the controller 100 relates the identification information and position information PC1 (hereinafter referred to as position information PC12) included in the signal SC1 sent from the vehicle 6B, with each other to store these information pieces in the storage 103.

The controller 100 calculates the distance D2 between the user 9A and the vehicle 6A (hereinafter referred to as a distance D21) on the basis of the position information PA1 and PC11, and calculates the distance D2 between the user 9A and the vehicle 6B (hereinafter referred to as a distance D22) on the basis of the position information PA1 and PC12. Here, the distance D21 is shorter than the distance D22.

Figure 15:
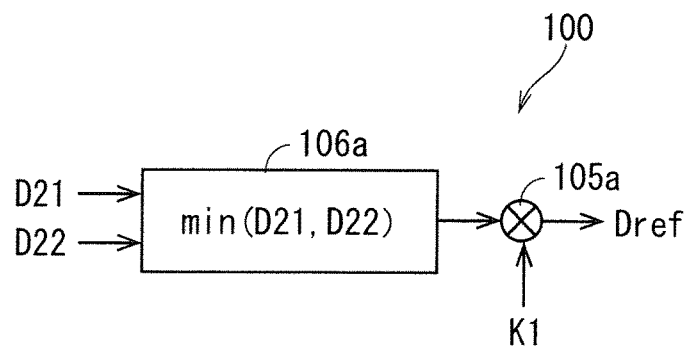
FIG. 15 is a diagram schematically illustrating an example configuration of the controller that sets a distance reference value.

FIG. 15 is a diagram schematically illustrating an example configuration of the controller 100 that sets the distance reference value Dref based on the vehicle information. The controller 100 comprises an information selector 106*a* and the multiplier 105*a*. The information selector 106*a* receives the vehicle information. In the example of FIG. 15, the information selector 106*a* receives the distances D21 and D22. The information selector 106*a* selects and then outputs the vehicle information that provides the smallest distance reference value Dref. In the example of FIG. 15, the information selector 106*a* outputs the distance D21, which is smaller than the distance D22, to the multiplier 105*a*. The multiplier 105*a* outputs the product of the distance D21 and predetermined value K1 as the distance reference value Dref, as earlier described.

In other words, the distance reference value Dref (=K1·D21) is employed that is specified based on the distance D21, which is smaller than the distance reference value Dref (=K1·D22) specified based on the distance D22. This enables the distance reference value Dref to be set in accordance with the most dangerous vehicle 6, thereby improving the traffic safety of the user 9A.

Although the foregoing example has provided how to set the distance reference value Dref based on the distance D2, the distance reference value Dref based on other vehicle information pieces is set in a similar manner.

The vehicle information used for setting the distance reference value Dref may be vehicle information about the vehicle 6 approaching the user 9A. In other words, the vehicle information about the vehicle 6 moving away from the user 9A, does not have to be used for setting the distance reference value Dref. This is because that the vehicle 6 moving away from the user 9A is of little traffic danger to the user 9A.

Accordingly, upon receiving the signal SC1 including the vehicle information from the vehicle 6, the controller 100 may determine whether the vehicle 6 is approaching the user 9A, on the basis of the vehicle information. When the position information PC1 of the vehicle 6 is included in the vehicle information for instance, the controller 100 may calculate the distance D2 between the user 9A and the vehicle 6, and may determine whether the vehicle 6 is approaching the user 9A on the basis of which is greater and which is smaller between the preceding distance D2 and the current distance D2. To be specific, when the current distance D2 is smaller than the preceding distance D2, the controller 100 determines that the vehicle 6 is approaching the user 9A.

Upon determining that the vehicle 6 is approaching, the controller 100 sets the distance reference value Dref based on the vehicle information of the vehicle 6. Upon determining that the vehicle 6 is moving away, the controller 100 does not use this vehicle information of the vehicle 6 when setting the distance reference value Dref. Accordingly, the controller 100 can set the distance reference value Dref based on necessary vehicle information, and may set the distance reference value Dref more properly.

Figure 16:
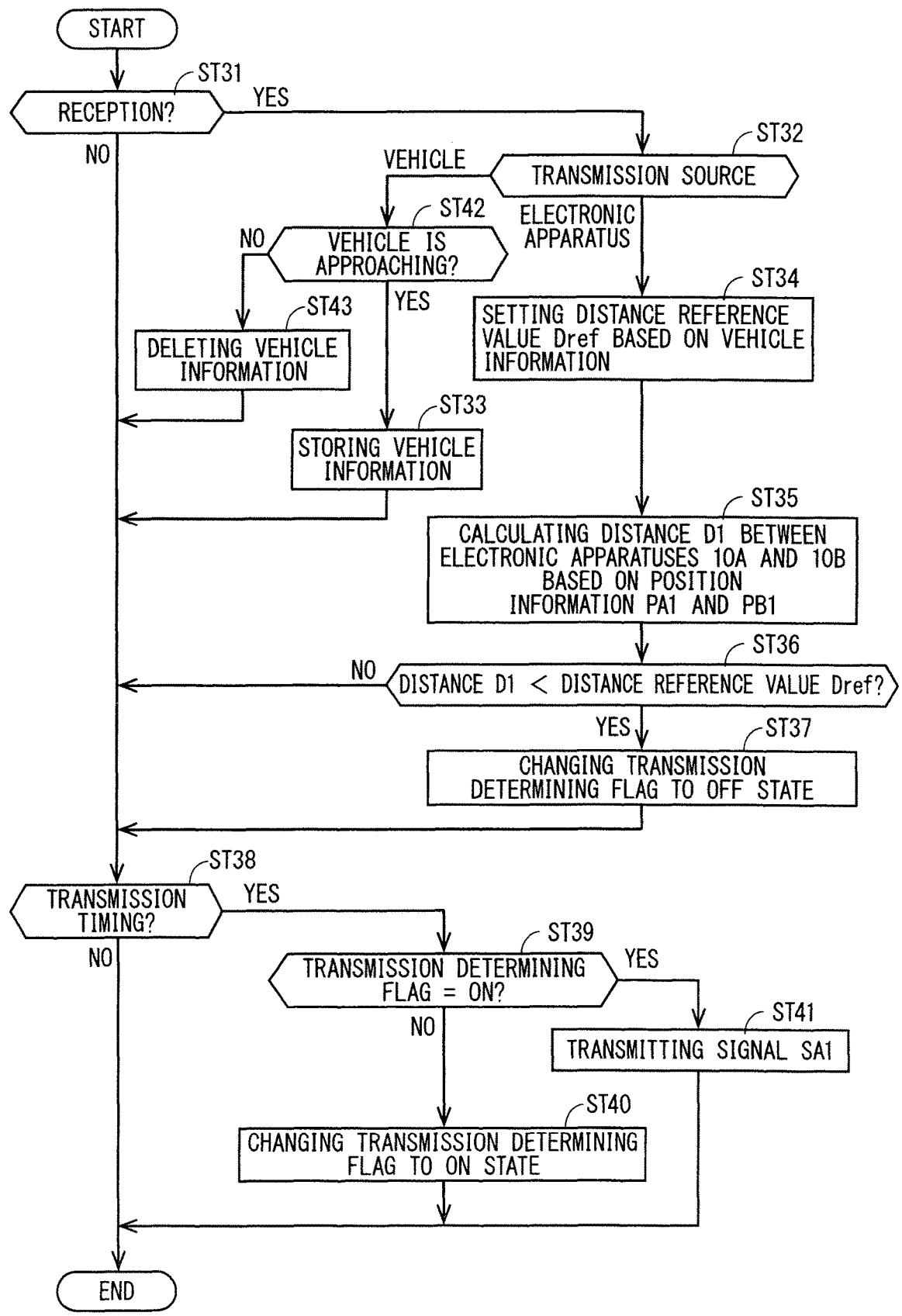
FIG. 16 is a flowchart illustrating an example operation of the controller.

FIG. 16 is a flowchart illustrating an example operation of the controller 100. In comparison with FIG. 10, the controller 100 executes additional steps ST42 and ST43. Upon determining that the transmission source is the vehicle 6 in step ST32, the controller 100 executes step ST42. In step ST42, the controller 100 determines whether the vehicle 6 is approaching the user 9A.

Upon determining that the vehicle 6 is approaching, the controller 100, in step ST33, relates the identification information and vehicle information (e.g., position information PC1) of the vehicle 6 with each other to store these information pieces in the storage 103. This vehicle information is used for setting the distance reference value Dref in step ST34 next time. Upon determining that the vehicle 6 is moving away in step ST42, the controller 100, in step ST43, deletes the identification information and vehicle information about the vehicle 6 from the storage 103 and executes the process step of step ST38. Accordingly, the vehicle information about the vehicle 6 moving away is not used for setting the distance reference value Dref in step ST34 next time.

As described above, a series of these process steps enables the distance reference value Dref to be set based on the vehicle information about the vehicle 6 approaching the user 9A.

The foregoing example has provided how to set the distance reference value Dref based on the vehicle information. The controller 100 may set the receiving intensity of the signal SA1 on the basis of the vehicle information, when restricting transmission of the signal SA1 in accordance with which is greater and which is smaller between the receiving intensity and a reception reference value. The shorter the distance D2 is, the higher the receiving intensity gets; hence the receiving intensity needs to be lowered when the distance reference value Dref is increased. For instance, the controller 100 sets the receiving intensity in such a manner that the receiving intensity decreases as the distance D2 increases.

In the foregoing specific example, the controller 100 does not transmit the signal SA1 when the electronic apparatus 10A is close to the electronic apparatus 10B. Nevertheless, how to restrict transmission of the signal SA1 is not limited to this specific example. For instance, the electronic apparatus 10A may restrict transmission of the signal SA1 by increasing an interval for transmitting the signal SA1 (i.e., time interval). In other words, when the electronic apparatus 10A is close to the electronic apparatus 10B, the controller 100 transmits the signal SA1 at transmission intervals longer than an interval for transmitting the signal SA1 at the time when the electronic apparatus 10A is not close to the electronic apparatus 10B (this interval is referred to as a normal transmission interval).

Figure 17:
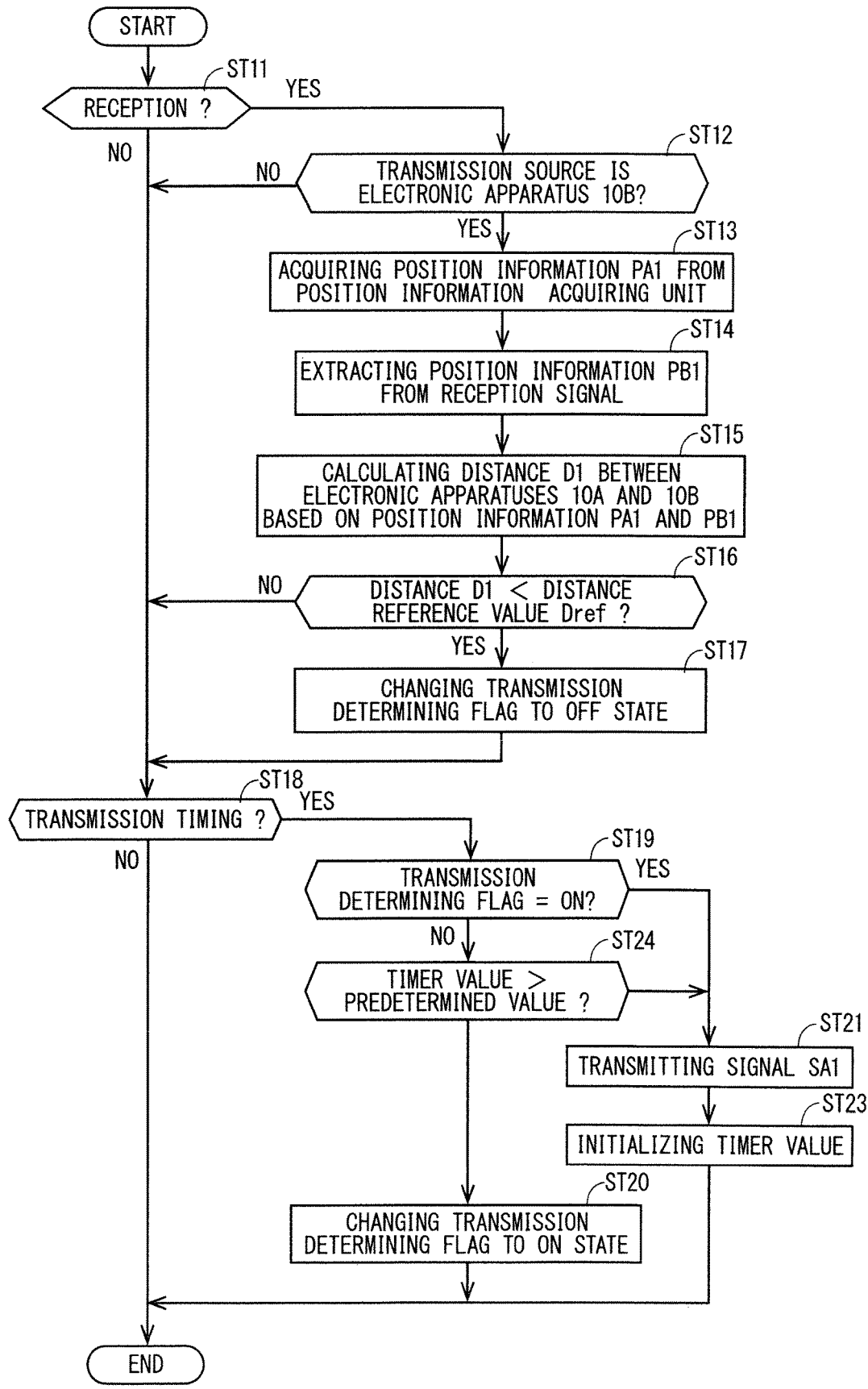
FIG. 17 is a flowchart illustrating an example operation of the controller.

FIG. 17 is a flowchart illustrating an example operation of the controller 100. The controller 100 herein has a timer function. The controller 100 increases a timer value on the basis of elapsed time. In comparison with FIG. 7, the controller 100 executes steps ST23 and ST24. Step ST23 is executed next to step ST21. In step ST23, the controller 100 initializes the timer value to zero and ends the process. In other words, the timer value is initialized every time the signal SA1 is transmitted.

Upon determining in step ST19 that the transmission determining frag F1 is in OFF state, the controller 100 executes step ST24. In step ST42, the controller 100 determines whether the timer value is larger than a predetermined value. This predetermined value is determined previously and set to be longer than the normal transmission interval, for instance. Upon determining that the timer value is larger than the predetermined value, the controller 100 executes the process step of step ST21. Upon determining that the timer value is smaller than the predetermined value, the controller 100 executes the process step of step ST20 without executing the process steps of steps ST21 and ST23.

According to a series of these process steps, the signal SA1 is transmitted after a lapse of a predetermined time period starting from the preceding transmission of the signal SA1, even when the transmission determining frag F1 is in OFF state. Furthermore, this predetermined time period is longer than the normal interval for transmitting the signal SA1. Accordingly, when the electronic apparatus 10A is close to the electronic apparatus 10B, the signal SA1 is transmitted at intervals longer than the normal transmission interval. This enables the electronic apparatus 10A to reduce the traffic volume of the safe-driving assistance communication system 1, as well. The electronic apparatus 10A, which can notify its surroundings of the presence of the user 9A, improves the traffic safety of the user 9A.

When restricting transmission of the signal SA1, the controller 100 may notify the vehicle 6 of this restriction. In other words, the controller 100 may transmit information that indicates that the controller 100 is restricting transmission of the signal SA1 (hereinafter referred to as restriction notification information 1), to the surroundings via the wireless-communication unit 110.

Upon receiving the restriction notification information 1, the vehicle 6 may notify the driver of the restriction notification information 1. This enables the driver to recognize that the user 9A is close to the user 9B.

When restricting transmission of the signal SA1, the controller 100 may notify the electronic apparatus 10B of this restriction. In other words, the controller 100 may transmit, to the electronic apparatus 10B via the wireless-communication unit 110, information that indicates that the controller 100 is restricting transmission of the signal SA1 (hereinafter referred to as restriction notification information 2) on the basis of the information received from the electronic apparatus 10B.

Upon receiving the restriction notification information 2, the electronic apparatus 10B may notify the user 9B of the restriction notification information 2. Such a configuration enables the user 9B to recognize a terminal (i.e., electronic apparatus 10A) that is restricting transmission of the signal SA1 on the basis of his/her own terminal (i.e., electronic apparatus 10B). In other words, this configuration reduces the possibility that the user 9B can operate the electronic apparatus 10B to stop transmitting the signal SB1 to the vehicle 6 after the electronic apparatus 10A restricts transmission of the signal SA1. Upon receiving the restriction notification information 2, the electronic apparatus 10B may forbid the user 9B to stop transmitting the signal SB1 to the vehicle 6 during a predetermined time period. When stopping the transmission of the signal SB1 to the vehicle 6 after receiving the restriction notification information 2, the electronic apparatus 10B may transmit, to the electronic apparatus 10A, information that indicates that the electronic apparatus 10B has stopped transmitting the signal SB1 to the vehicle 6. When receiving the information that indicates that the transmission of the signal SB1 to the vehicle 6 has been stopped, the electronic apparatus 10A may no longer restrict transmission of the signal SA1, even under a condition for restricting transmission of the signal SA1 on the basis of the information received from the electronic apparatus 10B. In other words, upon receiving the information that indicates that the transmission of the signal SB1 to the vehicle 6 has been stopped, the electronic apparatus 10A may transmit the signal SA1 to the vehicle 6.

This information, which is binary information, is less likely to increase the traffic volume of the safe-driving assistance communication system 1 when compared with an instance where the position information PA1 is transmitted.

While the electronic apparatus, the method of operating the electronic apparatus, and the control program have been detailed, the aforementioned description is in all aspects illustrative and not restrictive. The aforementioned various modifications are applicable in combination unless otherwise being inconsistent mutually. It is understood that numerous modifications not illustrated herein can be devised without departing from the scope of the present disclosure.

The invention claimed is:

1. An electronic apparatus comprising:
   a communication unit configured to perform wireless communication with an external device and a vehicle; and
   at least one processor configured to,
   (i) upon receiving, via the communication unit, a reception signal transmitted from the external device through one-to-many communication, make a determination based on the reception signal, about whether a first distance between the electronic apparatus and the external device is shorter than a distance reference value, and (ii) upon determining that the first distance is shorter than the distance reference value, perform a restricting process of restricting transmission of a transmission signal via the communication unit, wherein
when the at least one processor is restricting transmission of the transmission signal, the at least one processor transmits a signal that indicates that the at least one processor is restricting transmission of the transmission signal, to the vehicle via the communication unit.

2. The electronic apparatus according to claim 1, comprising a position information acquiring unit configured to acquire first position information that indicates a position of the electronic apparatus, wherein
the reception signal comprises second position information that indicates a position of the external device, and
the at least one processor calculates the first distance based on the first and second position information.

3. The electronic apparatus according to claim 1, wherein
the at least one processor determines whether a receiving intensity of the reception signal is larger than a reception reference value, and
upon determining that the receiving intensity is larger than the reception reference value, the at least one processor determines that the first distance is shorter than the distance reference value.

4. The electronic apparatus according to claim 1, comprising a position information acquiring unit configured to acquire first position information that indicates a position of the electronic apparatus, wherein
the at least one processor receives, via the communication unit, vehicle information comprising second position information that indicates a position of the vehicle, and
the at least one processor performs a setting process of setting the distance reference value in such a manner that the distance reference value increases as a second distance between the electronic apparatus and the vehicle increases, the second distance being calculated based on the first and second position information.

5. The electronic apparatus according to claim 1, wherein
the at least one processor receives, via the communication unit, vehicle information comprising vehicle speed information that indicates a traveling speed of the vehicle, and
the at least one processor performs a setting process of setting the distance reference value in such a manner that the distance reference value increases as the traveling speed of the vehicle, which is indicated by the vehicle speed information, decreases.

6. The electronic apparatus according to claim 1, comprising a position information acquiring unit configured to acquire first position information that indicates a position of the electronic apparatus, wherein
the at least one processor receives, via the communication unit, vehicle information comprising second position information and vehicle speed information, the second position information indicating a position of the vehicle, the vehicle speed information indicating a speed of the vehicle,
the at least one processor calculates a time necessary for the vehicle to reach the position of the electronic apparatus, on the basis of the first and second position information and the vehicle speed information, and
the at least one processor performs a setting process of setting the distance reference value in such a manner that the distance reference value increases as the time increases.

7. The electronic apparatus according to claim 4, wherein
the vehicle information comprises second position information that indicates a position of the vehicle,
in the setting process, the at least one processor makes a determination based on the second position information, about whether the vehicle is approaching the electronic apparatus, and
upon determining that the vehicle is approaching the electronic apparatus, the at least one processor sets the distance reference value based on the vehicle information.

8. The electronic apparatus according to claim 4, wherein
upon receiving pieces of the vehicle information from a plurality of vehicles via the communication unit, the at least one processor employs, as the distance reference value, a value that is the smallest of a plurality of the distance reference values specified in accordance with the individual pieces of vehicle information.

9. The electronic apparatus according to claim 1, wherein
the reception signal comprises traveling-speed information that indicates a traveling speed of a user carrying the external device, and
the at least one processor sets the distance reference value in such a manner that the distance reference value increases as the traveling speed, which is indicated by the traveling-speed information, increases.

10. The electronic apparatus according to claim 1, comprising a position information acquiring unit configured to acquire first position information that indicates a position of the electronic apparatus, wherein
the reception signal comprises second position information that indicates a position of the external device, and
in the restricting process, the at least one processor restricts transmission of the first position information.

11. An electronic apparatus comprising:
a communication unit configured to perform wireless communication with an external device and a vehicle; and
at least one processor configured to
(i) upon receiving, via the communication unit, a reception signal transmitted from the external device through one-to-many communication, make a determination based on the reception signal, about whether a first distance between the electronic apparatus and the external device is shorter than a distance reference value, and
(ii) upon determining that the first distance is shorter than the distance reference value, perform a restricting process of restricting transmission of a transmission signal via the communication unit, wherein
when the at least one processor is restricting transmission of the transmission signal, the at least one processor transmits a signal that indicates that the at least one processor is restricting transmission of the transmission signal, to the external device via the communication unit.

12. The electronic apparatus according to claim 1, wherein upon determining that the first distance is longer than the distance reference value, the at least one processor transmits the transmission signal.

13. A method for controlling an electronic apparatus comprising a position information acquiring unit, and a communication unit configured to perform wireless communication with an external device and a vehicle, the method comprising:
acquiring, via the position information acquiring unit, first position information that indicates a position of the electronic apparatus;

receiving, via the communication unit, vehicle information comprising second position information that indicates a position of the vehicle;

performing a setting process of setting a distance reference value in such a manner that the distance reference value increases as a second distance between the electronic apparatus and the vehicle increases, the second distance being calculated based on the first and second position information, wherein in the setting process, the electronic apparatus makes a determination based on the second position information, about whether the vehicle is approaching the electronic apparatus, and upon determining that the vehicle is approaching the electronic apparatus, the electronic apparatus sets the distance reference value based on the vehicle information, the method further comprising:

upon receiving, via the communication unit, a reception signal transmitted from the external device through one-to-many communication, making a determination based on the reception signal, about whether a first distance between the electronic apparatus and the external device is shorter than the distance reference value; and upon determining that the first distance is shorter than the distance reference value, restricting transmission of a transmission signal via the communication unit.

14. A non-transitory computer-readable storage medium storing a control program for controlling an electronic apparatus comprising a position information acquiring unit, and a communication unit configured to perform wireless communication with an external device and a vehicle, to perform processes of:

acquiring, via the position information acquiring unit, first position information that indicates a position of the electronic apparatus;

receiving, via the communication unit, vehicle information comprising second position information that indicates a position of the vehicle;

performing a setting process of setting a distance reference value in such a manner that the distance reference value increases as a second distance between the electronic apparatus and the vehicle increases, the second distance being calculated based on the first and second position information, and upon receiving pieces of the vehicle information from a plurality of vehicles via the communication unit, employing, as the distance reference value, a value that is the smallest of a plurality of the distance reference values specified in accordance with the individual pieces of vehicle information;

upon receiving, via the communication unit, a reception signal transmitted from the external device through one-to-many communication, making a determination based on the reception signal, about whether a first distance between the electronic apparatus and the external device is shorter than the distance reference value; and upon determining that the first distance is shorter than the distance reference value, restricting transmission of a transmission signal via the communication unit.

* * * * *